United States Patent
Wild et al.

(10) Patent No.: US 10,846,595 B2
(45) Date of Patent: Nov. 24, 2020

(54) RAPID COMPETITIVE LEARNING TECHNIQUES FOR NEURAL NETWORKS

(71) Applicant: Intel Corporation, Santa Clara, CA (US)

(72) Inventors: Andreas Wild, Portland, OR (US); Narayan Srinivasa, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1009 days.

(21) Appl. No.: 15/385,378

(22) Filed: Dec. 20, 2016

(65) Prior Publication Data

US 2018/0174054 A1 Jun. 21, 2018

(51) Int. Cl.
  *G06N 3/04* (2006.01)
  *G06N 3/08* (2006.01)
  *G06N 3/00* (2006.01)

(52) U.S. Cl.
  CPC .............. *G06N 3/088* (2013.01); *G06N 3/006* (2013.01); *G06N 3/049* (2013.01)

(58) Field of Classification Search
  CPC .................. G06N 3/049; G06N 3/088
  See application file for complete search history.

(56) References Cited

U.S. PATENT DOCUMENTS

| 7,904,398 B1* | 3/2011 | Repici | G06N 3/08 706/15 |
| 2015/0269485 A1* | 9/2015 | Julian | G06N 3/084 706/25 |
| 2017/0213129 A1* | 7/2017 | Lee | G06N 3/08 |

FOREIGN PATENT DOCUMENTS

WO  WO-2012018946 A1  2/2012

OTHER PUBLICATIONS

Morrison, Abigail, Ad Aertsen, and Markus Diesmann. "Spike-timing-dependent plasticity in balanced random networks." Neural computation 19.6 (2007): 1437-1467. (Year: 2007).*
"European Application Serial No. 17202653.6, Response filed Dec. 3, 2018 to Extended European Search Report dated May 18, 2018", 23 pgs.

(Continued)

*Primary Examiner* — Hal Schnee
(74) *Attorney, Agent, or Firm* — Schwegman Lundberg & Woessner, P.A.

(57) ABSTRACT

Various systems and methods for implementing unsupervised or reinforcement learning operations for a neuron weight used in a neural network are described. In an example, the learning operations include processing a spike train input at a neuron of a spiking neural network, applying a synaptic weight, and observing spike events occurring before and after the neuron processing based on respective spike traces. A synaptic weight update process operates to generate a new value of the synaptic weight based upon the spike traces, configuration values, and a reference weight value. A reference weight update process also operates to generate a new value of the reference value for significant changes to the synaptic weight. Reinforcement may be provided in some examples to implement changes to the reference weight in reduced time. In some examples, the techniques may be implemented in a neuromorphic hardware implementation of the spiking neural network.

23 Claims, 7 Drawing Sheets

(56) References Cited

OTHER PUBLICATIONS

"Hebbian theory", Wikipedia, [Online]. Retrieved from the Internet: <URL: https://en.wikipedia.org/wiki/Hebbian_theory>, (Accessed: Feb. 28, 2017), 6 pgs.

"Spike-timing-dependent plasticity", Wikipedia, [Online], Retrieved from the Internet: <URL: https://en.wikipedia.org/wiki/Spike-timing-dependent_plasticity>, (Accessed: Feb. 28, 2017), 5 pgs.

Lecun, Yann, et al., "Gradient-Based Learning Applied to Document Recognition", Proceeding of the IEEE, 86(11), (Nov. 1998), 2278-2324.

Maass, Wolfgang, "Networks of Spiking Neurons: The Third Generation of Neural Models", Neural Networks, vol. 10, No. 9, (1997), 1659-1671.

Merolla, Paul A, et al., "A million spiking-neuron integrated circuit with a scalable network and interface", Science, 345(6197), (Aug. 8, 2014), 668-673.

Qiao, Ning, et al., "A reconfigurable on-line learning spiking neuromorphic processor comprising 256 neurons and 128K synapses", Frontiers in Neuroscience, vol. 49, Article 141, (Apr. 29, 2015), 1-17.

Shapero, Samuel, et al., "Configurable hardware integrate and fire neurons for sparse approximation", Neural Networks, vol. 45, (Sep. 2013), 134-143.

Sjöström, Jesper, et al., "Spike-timing dependent plasticity", Scholarpedia, 5(2):1362, [Online]. Retrieved from the Internet: <URL: http://www.scholarpedia.org/article/Spike-timing_dependent_plasticity>, (Last Modified:Sep. 15, 2015), 21 pgs.

"European Application Serial No. 17202653.6, Extended European Search Report dated May 18, 2018", 12 pgs.

Andrea, Soltoggio, et al., "Short-term plasticity as cause-effect hypothesistesting in distal reward learning", Biological Cybernetics, Springer Verlag. Heidelberg, DE, vol. 109, No. 1, (Sep. 5, 2014), 75-94.

Florian, Razvan, et al., "Letter Communicated by Gal Chechik Reinforcement Learning Through Modulation of Spike-Timing-Dependent Synaptic Plasticity", Neural Computation 19, Retrieved from the Internet: URL:<http://florian.iojpapers/2007_Florian_Modulated STDP.pdf>, (2007), 1468-1502.

Morrison, Abigail, et al.,"Phenomenological models of synaptic plasticity based on spike timing", Biological Cybernetics; Advances in Computational Neuroscience, Springer, Berlin, DE, vol. 98, No. 6, (May 20, 2008), 459-478.

Steve, Furber, "Large-scale neuromorphic computing systems", Journal of Neural Engineering, Institute of Physics Publishing, Bristol, GB, val. 13, No. 5, (Aug. 16, 2016), 14 pgs.

\* cited by examiner

US 10,846,595 B2

RAPID COMPETITIVE LEARNING TECHNIQUES FOR NEURAL NETWORKS

TECHNICAL FIELD

Embodiments described herein generally relate to neural network learning techniques, and in particular, the embodiments described herein relate to algorithms for reinforcement learning and unsupervised learning applied within spiking neural network implementations.

BACKGROUND

A variety of approaches are currently used to implement neural networks in computing systems. The implementation of such neural networks, commonly referred to as "artificial neural networks", generally include a large number of highly interconnected processing elements that exhibit some behaviors similar to that of organic brains. Such processing elements may be implemented with specialized hardware, modeled in software, or a combination of both.

Neural networks are configured to implement features of "learning", which generally is used to adjust the weights of respective connections between the processing elements that provide particular pathways within the neural network and processing outcomes. Existing approaches for implementing learning in neural networks have involved various aspects of unsupervised learning (e.g., techniques to infer a potential solution from unclassified training data, such as through clustering or anomaly detection), supervised learning (e.g., techniques to infer a potential solution from classified training data), and reinforcement learning (e.g., techniques to identify a potential solution based on maximizing a reward). However, each of these learning techniques are complex to implement, and extensive supervision or validation is often required to ensure the accuracy of the changes that are caused in the neural network.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
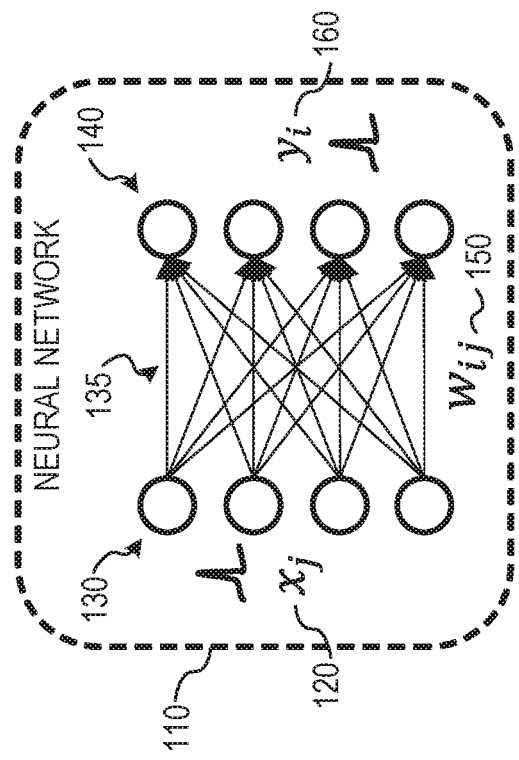
FIG. 1 illustrates a diagram of a simplified neural network, according to an example.

In the following description, methods, configurations, and related apparatuses are disclosed for implementation of event-driven learning rules for a spiking neural network. In an example, the event-driven learning rules may be triggered as a result of a neuron firing, which causes a "spike" or similar output to be triggered. The event-driven learning rules may provide a seamless transition between unsupervised learning and reinforcement learning within implementations of a spiking neural network. The techniques described herein may be utilized, for example, in a hardware-based implementation of a spiking neural network such as in a neuromorphic computing architecture that includes respective hardware features to represent neurons, synapses, axons, and dendrites for processing actions of the spiking neural network. (A detailed example hardware-based implementation of a neuromorphic computing architecture is discussed below with reference to FIG. 9).

As discussed in the following examples, the presently disclosed configuration may be used in learning operations of a spiking neural network operating in an unsupervised learning mode or operating in a reinforcement learning mode. For example, in an unsupervised learning mode, the neural network operates to extract some information from incoming data and conduct adjustments to weights and other connection features of the neural network—without outside intervention—by correlating inputs and outputs to converge on an output that represents an input set. Also for example, in a reinforcement learning mode, the neural network operates to modify adjustments to weights and other connection features of the neural network based on qualitative feedback (e.g., rewards), provided by an actor outside of the neural network. The presently disclosed unsupervised learning algorithm and reinforcement learning algorithm address these respective cases with an event-driven model, providing a mix of activity and external tuning controls for learning, persistency, robustness, and memory (e.g., remembering or forgetting past activity).

In an example, the presently disclosed learning algorithm (in either form of an unsupervised learning algorithm or a reinforcement learning algorithm) may be implemented in a spiking neural network that offers spikes that are inputs and outputs to neurons. The basic implementation of the learning algorithms may be provided through spike timing dependent plasticity, which adjusts the strength of connections (e.g., synapses) between neurons in a neural network based on correlating the timing between an input spike and an output spike. Input spikes that closely proceed an output spike for a neuron are considered causal to the output and are strengthened while other input spikes are weakened. Specifically, here, the techniques provide the ability to use spike times to allow a neural network's operation to be equally modified in an unsupervised learning mode or in a reinforced learning mode. Additionally, in another example, aspects of robustness versus forgetting in an unsupervised mode or in a reinforcement mode may also be implemented if the weight changes are not induced through a pre- and post-synaptic spike train (e.g., discrete events in time), but if the pre- and post-synaptic activity are described by firing rates (e.g., continuous values).

Existing approaches for implementing learning methods in a neural network commonly involve use of a supervised learning process, such as a supervised learning process that implements weight adjustments and threshold changes through techniques such as backpropagation. With use of the techniques described herein, an example learning process may provide a learning rule capable of unsupervised learning with consolidation of weight changes, such that only strong or enduring activity-induced changes of weights are persisted. Here, reference weight values are used to protect against momentary perturbation of input spikes unduly affecting the synaptic weight actively applied in a neural pathway. The example learning process may also provide a learning rule capable of reinforcement learning, which allows weight values to return to a reference value unless a reinforcement signal is invoked. This reinforcement signal may cause the reference weight value to move quickly towards the actively applied synaptic weight value, causing prior-learned patterns to persist.

Additionally, techniques described herein allow the transition from an unsupervised learning process to a reinforcement learning process, with a learning model that may be adapted for either approach. Further, triplet spike-timing-dependent plasticity and heterosynaptic behavior that is observed by either of the unsupervised or reinforced learning scenarios may be used to induce competitive learning, to enable only the strongest, most correlated inputs to cause learning changes in the neural network.

The techniques discussed herein provide a learning mechanism that is fully event-driven, with learning that exploits causality and correlation in inputs and outputs. This offers competitiveness of non-supervised feature learning with improvement efficiency that approaches those found in supervised learning models. Further, the techniques discussed herein enable a seamless combination of reinforced learning with unsupervised learning, without the overhead of supervised learning techniques. This offers a particularly efficient implementation in neuromorphic hardware that is designed to implement recurrence and dynamic feedback though a spiking neural network design.

As used herein, references to "neural network" for at least some examples is specifically meant to refer to a "spiking neural network"; thus, many references herein to a "neuron" are meant to refer to an artificial neuron in a spiking neural network. It will be understood, however, that certain of the following examples may also apply to other forms of artificial neural networks.

FIG. 1 illustrates an example diagram of a simplified neural network 110, providing an illustration of connections 135 between a first set of nodes 130 (e.g., neurons) and a second set of nodes 140 (e.g., neurons). Neural networks (such as the simplified neural network 110) are commonly organized into multiple layers, including input layers and output layers. It will be understood that the simplified neural network 110 only depicts two layers and a small numbers of nodes, but other forms of neural networks may include a large number of nodes, layers, connections, and pathways.

Data that is provided into the neutral network 110 is first processed by synapses of input neurons. Interactions between the inputs, the neuron's synapses and the neuron itself govern whether an output is provided via an axon to another neuron's synapse. Modeling the synapses, neurons, axons, etc., may be accomplished in a variety of ways. In an example, neuromorphic hardware includes individual processing elements in a synthetic neuron (e.g., neurocore) and a messaging fabricate to communicate outputs to other neurons. The determination of whether a particular neuron "fires" to provide data to a further connected neuron is dependent on the activation function applied by the neuron and the weight of the synaptic connection (e.g., $w_{i,j}$ 150) from neuron j (e.g., located in a layer of the first set of nodes 130) to neuron i (e.g., located in a layer of the second set of nodes 140). The input received by neuron j is depicted as value $x_j$ 120, and the output produced from neuron i is depicted as value $y_i$ 160. Thus, the processing conducted in a neural network is based on weighted connections, thresholds, and evaluations performed among the neurons, synapses, and other elements of the neural network.

In an example, the neural network 110 is established from a network of spiking neural network cores, with the neural network cores communicating via short packetized spike messages sent from core to core. For example, each neural network core may implement some number of primitive nonlinear temporal computing elements as neurons, so that when a neuron's activation exceeds some threshold level, it generates a spike message that is propagated to a fixed set of fanout neurons contained in destination cores. The network may distribute the spike messages to all destination neurons, and in response those neurons update their activations in a transient, time-dependent manner, similar to the operation of real biological neurons.

The neural network 110 further shows the receipt of a spike, represented in the value $x_j$ 120, at neuron j in a first set of neurons (e.g., a neuron of the first set of nodes 130). The output of the neural network 110 is also shown as a spike, represented by the value $y_i$ 160, which arrives at neuron i in a second set of neurons (e.g., a neuron of the first set of nodes 140) via a path established by the connections 135. In a spiking neural network all communication occurs over event-driven action potentials, or spikes. In an example, the spikes convey no information other than the spike time as well as a source and destination neuron pair. Computation occurs in each neuron as a result of the dynamic, nonlinear integration of weighted spike input using real-valued state variables. The temporal sequence of spikes generated by or for a particular neuron may be referred to as its "spike train."

In an example of a spiking neural network, activation functions occur via spike trains, which means that time is a factor that has to be considered. Further, in a spiking neural network, each neuron is modeled after a biological neuron, as the artificial neuron receives its inputs via synaptic connections to one or more "dendrites" (part of the physical structure of a biological neuron), and the inputs affect an internal membrane potential of the artificial neuron "soma" (cell body). In a spiking neural network, the artificial neuron "fires" (e.g., produces an output spike), when its membrane potential crosses a firing threshold. Thus, the effect of inputs on a spiking neural network neuron operate to increase or decrease its internal membrane potential, making the neuron more or less likely to fire. Further, in a spiking neural network, input connections may be stimulatory or inhibitory. A neuron's membrane potential may also be affected by changes in the neuron's own internal state ("leakage").

Figure 2:
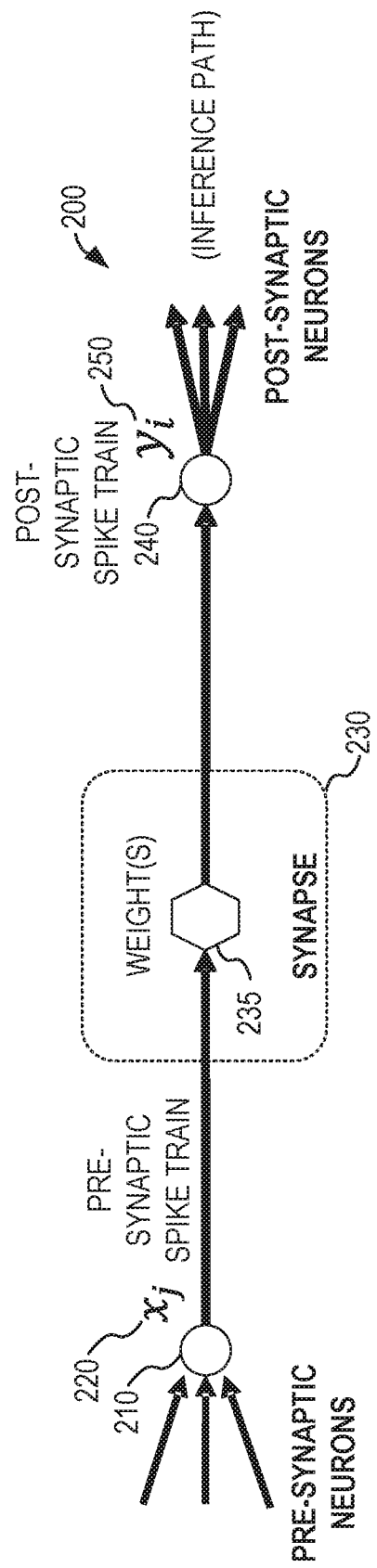
FIG. 2 illustrates an inference path of a neuron in a spiking neural network, according to an example.

FIG. 2 illustrates an example inference path 200 in a spiking neural network, such as may be implemented by a form of the neural network 110 or other forms of neural networks. The inference path 200 of the neuron includes a pre-synaptic neuron 210, which is configured to produce a pre-synaptic spike train $x_j$ 220 representing a spike input. A spike train is a temporal sequence of discrete spike events, which provides a set of times specifying at which time a neuron fires.

As shown, the spike train $x_j$ 220 is produced by the neuron before the synapse (e.g., neuron 210), and the spike train $x_j$ 220 is evaluated for processing according to the characteristics of a synapse 230. For example, the synapse may apply one or more weights, e.g., weight 235, which are used in evaluating the data from the spike train $x_j$ 220. Input spikes from the spike train $x_j$ 220 enter a synapse such as synapse 230 which has a weight $w_{i,j}$ 235A. This weight scales what the impact of the presynaptic spike has on the post-synaptic neuron (e.g., neuron 240). If the integral contribution of all input connections to a post-synaptic neuron exceeds a threshold, then the post-synaptic neuron 240 will fire and produce a spike. As shown, $y_i$ 250 is the post-synaptic spike train produced by the neuron following the synapse (e.g., neuron 240) in response to some number of input connections. As shown, the post-synaptic spike train $y_i$ 250 is distributed from the neuron 240 to other post-synaptic neurons.

Figure 3:
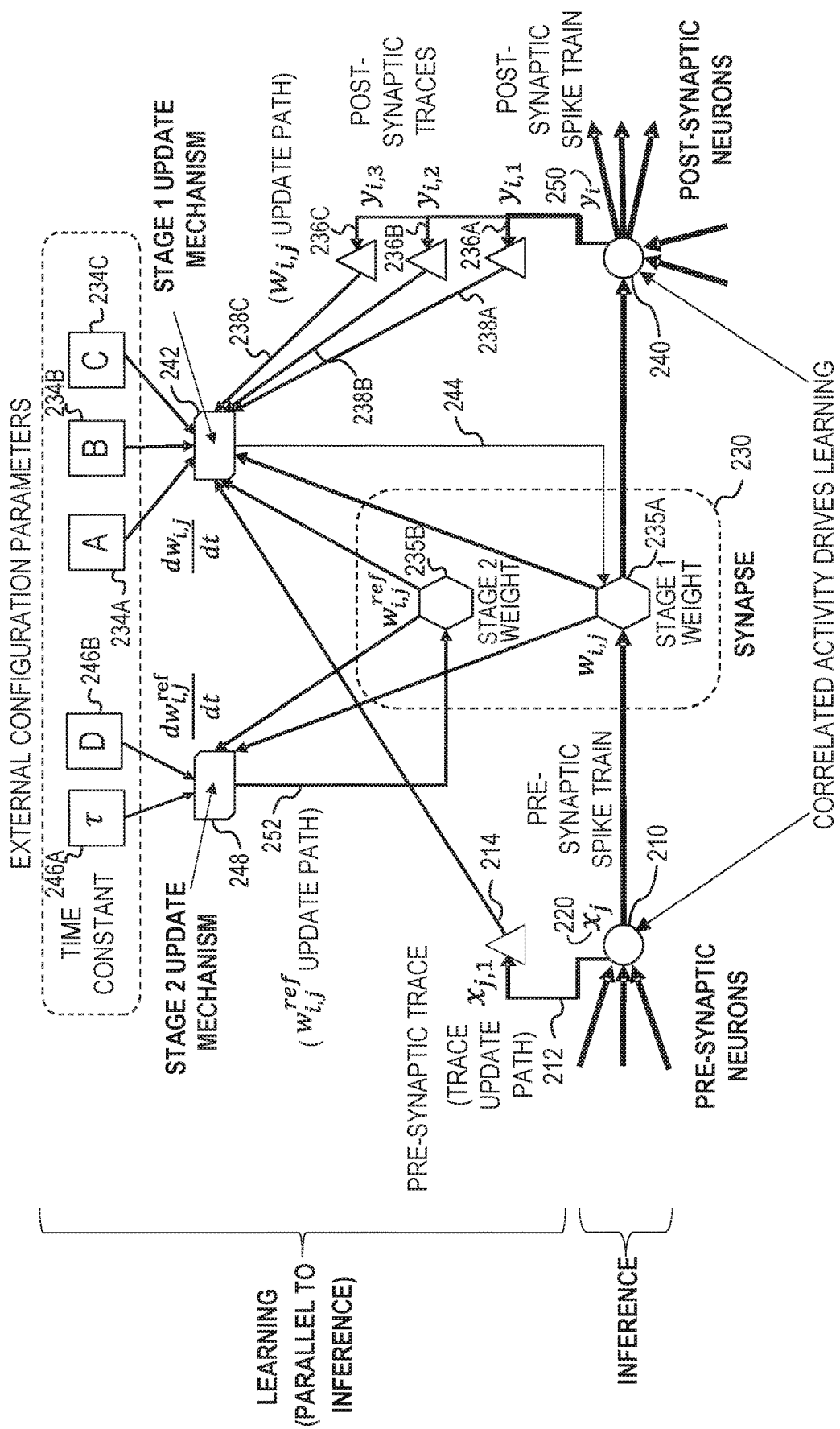
FIG. 3 illustrates learning and inference paths of a spiking neural network applied with a learning model, according to an example.

FIG. 3 illustrates example learning and inference paths of a spiking neural network, applied in a learning model according to the techniques further discussed herein. The architecture of FIG. 3 depicts the operation of the synapse 230 that is adapted with a two-stage weight memory for purposes of implementing a learning algorithm. The synapse 230 specifically includes involvement of an inference path (as discussed above for FIG. 2, to facilitate data processing between the pre-synaptic neuron 210 and the post-synaptic neuron 240) and a learning path, parallel to the inference path, which includes the evaluation of a pre-synaptic trace and multiple post-synaptic traces, for learning based on spike timing dependent plasticity.

The role of the Stage 1 weight $w_{i,j}$ 235A, is as a synaptic weight applied within the synapse 230 to the input spike data, to facilitate processing of the pre-synaptic spike train $x_j$ 220. The Stage 1 weight $w_{i,j}$ 235A that is used in the synapse 230 is then updated for subsequent uses of the synapses (e.g., after processing of pre-synaptic spike train) through a Stage 1 update mechanism 242 (identified as part of a "$w_{i,j}$ update path" 244). The characteristics of the Stage 1 update mechanism 242 are further described below.

The synapse 230 also maintains a second weight value, Stage 2 weight $w_{i,j}^{ref}$ 235A, which is used as a reference weight for balancing the learning process and the changes to the Stage 1 weight $w_{i,j}$ 235A. The Stage 2 weight $w_{i,j}^{ref}$ 235B is updated for subsequent uses with specific refinements through use of a Stage 2 update mechanism 248 (identified as part of a "$w_{i,j}^{ref}$ update path" 252).

The $w_{i,j}$ update path 244, provided as a result of the Stage 1 update mechanism 242, includes the evaluation of data from: a pre-synaptic trace 212 providing data $x_{j,1}$ 214, obtained via a trace update path at the pre-synaptic neuron 210; the existing value (the first value) of Stage 1 weight $w_{i,j}$ 235A; the existing value (the first value) of Stage 2 weight $w_{i,j}^{ref}$ 235B; post-synaptic traces 236A (providing data value $y_{i,1}$ 238A), 236B (providing data value $y_{i,2}$ 238B), 236C (providing data value $y_{i,3}$ 238B), obtained via a trace path from the output point 250; and external configuration values A 234A, B 234B, C 234C. In an example, the configuration values (e.g., A 234A, B 234B, C 234C) are based on the application and the statistics of the pre- and post-synaptic spike trains. A, B, C may be used to determine the relative contribution of long-term depression (A), long-term potentiation (B) and weight consolidation (C) to the weight's temporal rate of change $$\frac{dw_{i,j}}{dt}.$$

Thus A, B, C together determine the learning rate of the weight.

In order to choose A and B, a simplifying temporal average of the first part of the $$\frac{dw_{i,j}}{dt}$$

equation may be computed as follows:

$$\frac{dw_{i,j}}{dt} \propto \langle x_j \rangle \cdot \langle y_i \rangle \cdot (A + B \cdot \langle y_i \rangle)$$

where $\langle \ldots \rangle$ denotes temporal average of the pre (x) and post (y) synaptic spike trains. With A<0 and B>0, this roughly describes a quadratic dependence of $$\frac{dw_{i,j}}{dt}$$

on the post synaptic firing rate $\langle y_i \rangle$ where $$\frac{dw_{i,j}}{dt} < 0$$

for $\langle y_i \rangle < y_{th}$ and where $$\frac{dw_{i,j}}{dt} > 0$$

for $\langle y_i \rangle > y_{th}$. The particular choice of A and B allows the user to select the crossover threshold $y_{th}$ below which weight changes are depressive and above which weight changes are potentiating.

In this example, the programmable dependence of weight potentiation versus depression makes the learning rule competitive, such that only those input patterns that cause strong post synaptic firing ($\langle y_i \rangle > y_{th}$) lead to potentiation. Considering actual spike trains with discrete spike events in time (and not a temporal average of spike trains) the above is still true; in addition, certain temporal correlations in the spike trains may favor either depression or potentiation but the math is simpler in the temporally averaged case.

Depending on the values of A, B and time constants of the pre- and post-synaptic traces, the value of C is negative to allow for a return of $w_{i,j}$ to $w_{i,j}^{ref}$. The magnitude of C (e.g., a learning rate of this particular contribution to the weight rate of change) may be application dependent. Further, the time constants used to compute the pre and post synaptic traces (which may be considered exponential moving averages) are chosen such that the desired temporal correlations in the pre- and post-synaptic signals may be captured (which again, is application dependent).

In an example, the Stage 1 update mechanism 242 may produce a value represented by the following equation:

$$\frac{dw_{i,j}}{dt} = A \cdot x_j \cdot y_{i,1} + B \cdot y_i \cdot x_{j,1} \cdot y_{i,2}^q + C \cdot (w_{i,j} - w_{i,j}^{ref}) \cdot y_{i,3} \cdot y_i$$

The $w_{i,j}^{ref}$ update path 252, provided as a result of the Stage 2 update mechanism 248, includes the evaluation of data for implementing updates to the Stage 2 weight 235B (e.g., generating a second value for the reference weight). This may include the evaluation of data from: the existing Stage 1 weight $w_{i,j}$ 235A (e.g., the first value of the synaptic weight); the existing Stage 2 weight $w_{i,j}^{ref}$ 235B (e.g., first value of the reference weight weight); an external configuration value D 246B, and a time constant 246A.

Here, $$\frac{dw_{i,j}^{ref}}{dt}$$

is the rate of change of the reference weight. $w_{i,j}^{ref}$ serves as a kind of longer term memory of the history of $w_{i,j}$. Thus $$\frac{dw_{i,j}^{ref}}{dt}$$

controls how fast that memory is updated or how fast or easy momentary changes in $w_{i,j}$ affect the reference weight. $dw_{i,j}^{ref}$ is composed of two driving forces: a drift force $f^{drift}$ and a relaxation force $f^{relax}$ described below. Parameter D controls the contribution strength of the relaxation force.

In an example, the Stage 2 update mechanism 248 may produce a value represented by the following equation:

$$\frac{dw_{i,j}^{ref}}{dt} = \frac{f^{drift} + f^{relax}}{\tau^{cons}}$$

Where the drifting and relaxation functions are defined as:

$$f^{drift} = w_{i,j} - w_{i,j}^{ref}$$

$$f^{relax} = -\frac{dP}{dw_{i,j}^{ref}} = -D \cdot w_{i,j}^{ref} \cdot \left(\frac{w^{max}}{2} - w_{i,j}^{ref}\right) \cdot (w^{max} - w_{i,j}^{ref})$$

In the preceding equations, the "A", "B" configuration parameter terms modify weight, while the "C" configuration parameter term modifies the weight and determines whether modification is persistent or fades away. The "D" configuration parameter may be used to control what deviation $w_{i,j} - w_{i,j}^{ref}$ is required to make $w_{i,j}^{ref}$ move towards $w_{i,j}$ or whether $w_{i,j}^{ref}$ tends to stick to the bi-stable points defined by the function P. Additionally, as discussed below, if the system is used in reinforcement mode, a reinforcement signal also may be used to lower the time constant $\Sigma^{cons}$ temporarily such that the reference weight moves quickly towards the actual weight, faster than the actual weight moves towards the reference weight. As a result, the momentary change of $w_{i,j}$ remains.

Figure 4:
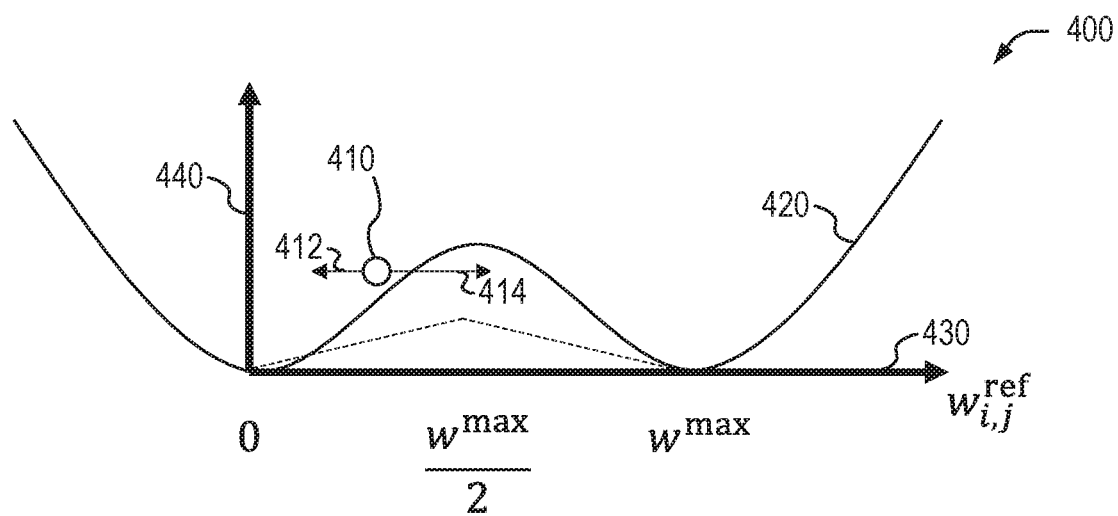
FIG. 4 illustrates a graph depicting movement of a reference weight applied in a learning model, according to an example.

FIG. 4 illustrates an example graph 400 depicting example movement of a reference weight applied in a learning model, such as in the two-stage weighted learning model illustrated in FIG. 3 and discussed above. As shown, the reference weight value 410 (e.g., a value used to determine $w_{i,j}^{ref}$) is charted on a first axis 430 between a minimum value (0) and a maximum value ($w^{max}$), and the influence of applied forces (e.g., relaxation and drifting forces) is charted on a second axis 440.

The reference weight value 410 is subject to movement based on a result of the learning function, but is constrained to converge towards either the minimum value or the maximum value as shown by the charting of the function with curve 420. Curve 420 is described by function P above:

$$P = -\int f^{relax} \cdot dw_{i,j}^{ref}.$$

In an analogy to physics, this corresponds to the potential that gives rise to the relaxation force, in the same way that the potential of gravity gives rise to a gravitational force. Thus, P is not the force itself but is equivalent to an energy landscape which the reference weight is subjected. The negative gradient of that energy landscape it is the resultant relaxation force.

The reference weight value 410 is shown as being subject to movement from a relaxation force 412 and a drift force 414. The reference weight value 410 may be moved in a first direction towards the minimum value (or towards the maximum value) when the relaxation force 412 is applied. Further, the reference weight value 410 may be moved more strongly in a direction away from the minimum value (or away from the maximum value) based on a drift force 414 applied to the reference weight value 410.

Figure 5:
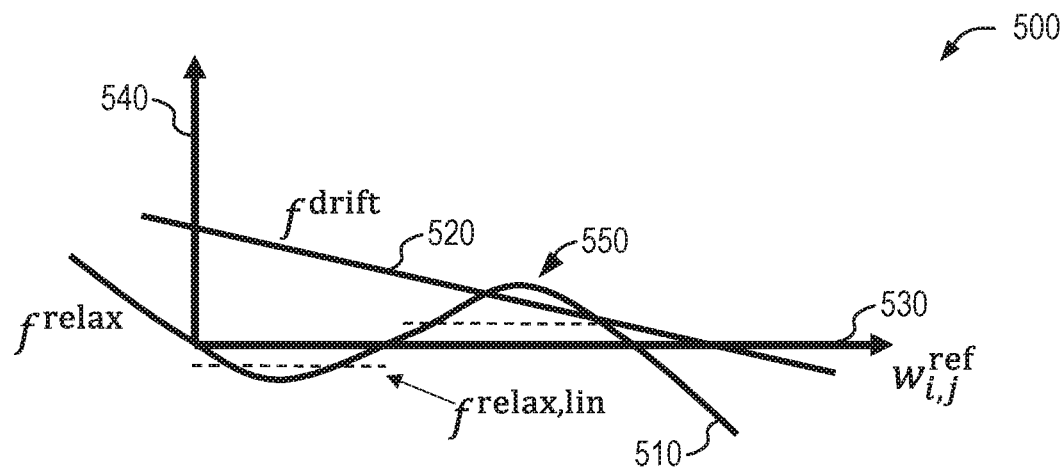
FIG. 5 illustrates a graph of weight dynamics for drift and relaxation functions used to change a reference weight applied in a learning model, according to an example.

FIG. 5 illustrates an example graph 500 of weight dynamics for drift and relaxation functions used to change a reference weight value in a learning model. Again, the reference value $w_{i,j}^{ref}$ may be charted on a first axis 530 between some minimum and maximum value, with the influence of the respective drifting and relaxation forces being charted on a second axis 540. The values of the relaxation function are shown with line 510, and the values of the drift function are shown with line 520. Thus, the drift force may be skewed in a direction towards maximum or minimum (the drift force is shown as skewed towards maximum in FIG. 5) causing the reference weight value to move in that direction. However, the relaxation force serves as a counterbalance, as the relaxation force may slow or stop movement of the reference weight value towards the maximum at a point where the relaxation force is stronger than the drift (e.g., at point 550). However, if the drift force overcomes or is changed, then the reference weight value will continue to move towards the maximum value.

Figure 6:
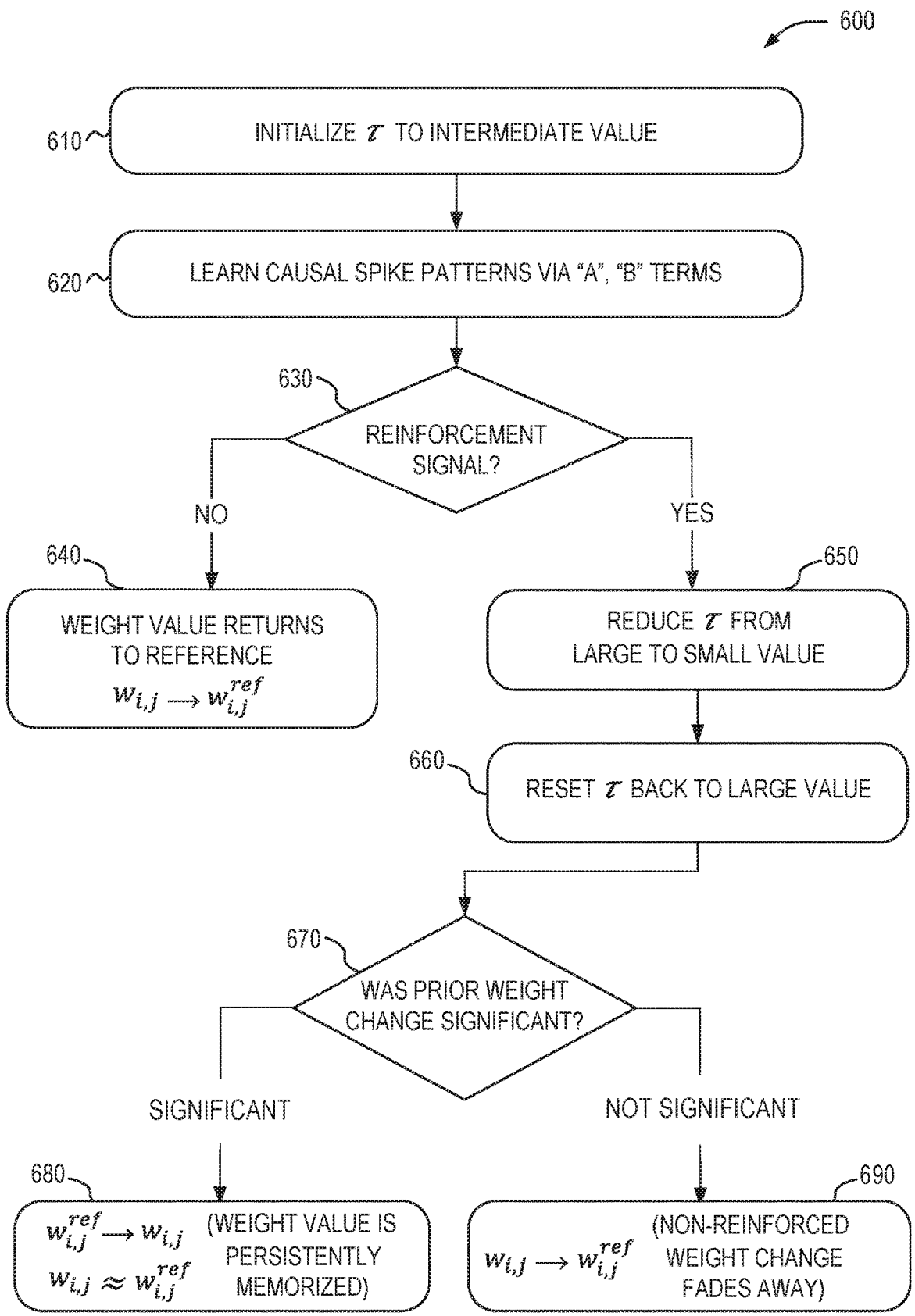
FIG. 6 illustrates a flowchart of operations applied in a reinforcement learning algorithm, according to an example.

FIG. 6 illustrates a flowchart 600 of example operations applied in a reinforcement learning algorithm, based on an implementation of the weight update techniques discussed above. For example, the reinforcement learning algorithm may implement the synaptic weight and reference weight modifications depicted in FIG. 3, using correlated activity between a pre-synaptic spike train and a post-synaptic spike train to provide reinforcement of weight values updated with multi-stage update mechanisms.

The flowchart 600 begins operations with the initialization of a time constant, τ to an intermediate value (operation 610). Depending on the application input, patterns will change with a certain frequency or gradually change from one pattern to the next on a particular time scale. Depending on how fast the user wants the neural network to adapt to a changing environment, $\Sigma^{cons}$ may be chosen with respect to the dynamics of the environment. For example, if the environmental time constant is short with respect to $\tau^{cons}$ then the dynamics of $$\frac{dw_{i,j}^{ref}}{dt}$$

will average over many environmental pattern changes (that maybe useful to reduce noise). In the opposite situation where $\tau^{cons}$ is short, then the network adapts more quickly to environmental changes at the expense of more noise in the learning process of $$\frac{dw_{i,j}^{ref}}{dt}.$$

Next, the neural network operates to learn causal spike patterns via "A" and "B" parameter terms (operation 620), which are used to modify the subject weight applied in the weight update process (e.g., with the Stage 1 update mechanism). Further operations in the flowchart 600 are based on whether a reinforcement signal is provided (evaluation 630).

If a reinforcement signal is not provided, the learning algorithm operates to move the weight value to the reference weight value (e.g., $w_{i,j} \rightarrow w_{i,j}^{ref}$) (operation 640). If a reinforcement signal is provided, the time constant is first reduced from a large to a small value (operation 650), and is then returned to its value so that the reference value $w_{i,j}^{ref}$ may change (operation 660). In some examples of neuromorphic hardware, the reinforcement signal may be applied by a conventional CPU that temporarily changes the network configuration (e.g., $\Sigma^{cons}$).

Restated, the reinforcement signal temporarily reduces r such that $w_{i,j}^{ref}$ moves more quickly towards $w_{i,j}$ than vice versa (so that the prior learned pattern does not persist). As one non-limiting example, consider that before any spike has occurred, the neural network may have learned a certain pattern P1. A new pattern is presented, P2, that the network adapts to via the A, B terms. Without reinforcement, the network may return to P1; with reinforcement, P2 does persist.

The effect of the reinforcement is shown in the final operations of FIG. 6. If the prior weight change was significant (evaluation 670), then the weight value is persistently memorized (as $w_{i,j}^{ref} \rightarrow w_{i,j}$ and then $w_{i,j} \rightarrow w_{i,j}^{ref}$) (operation 680). If the prior weight change was not significant (evaluation 670), then the non-reinforced weight change fades away (as $w_{i,j} \rightarrow w_{i,j}^{ref}$) (operation 690).

Figure 7:
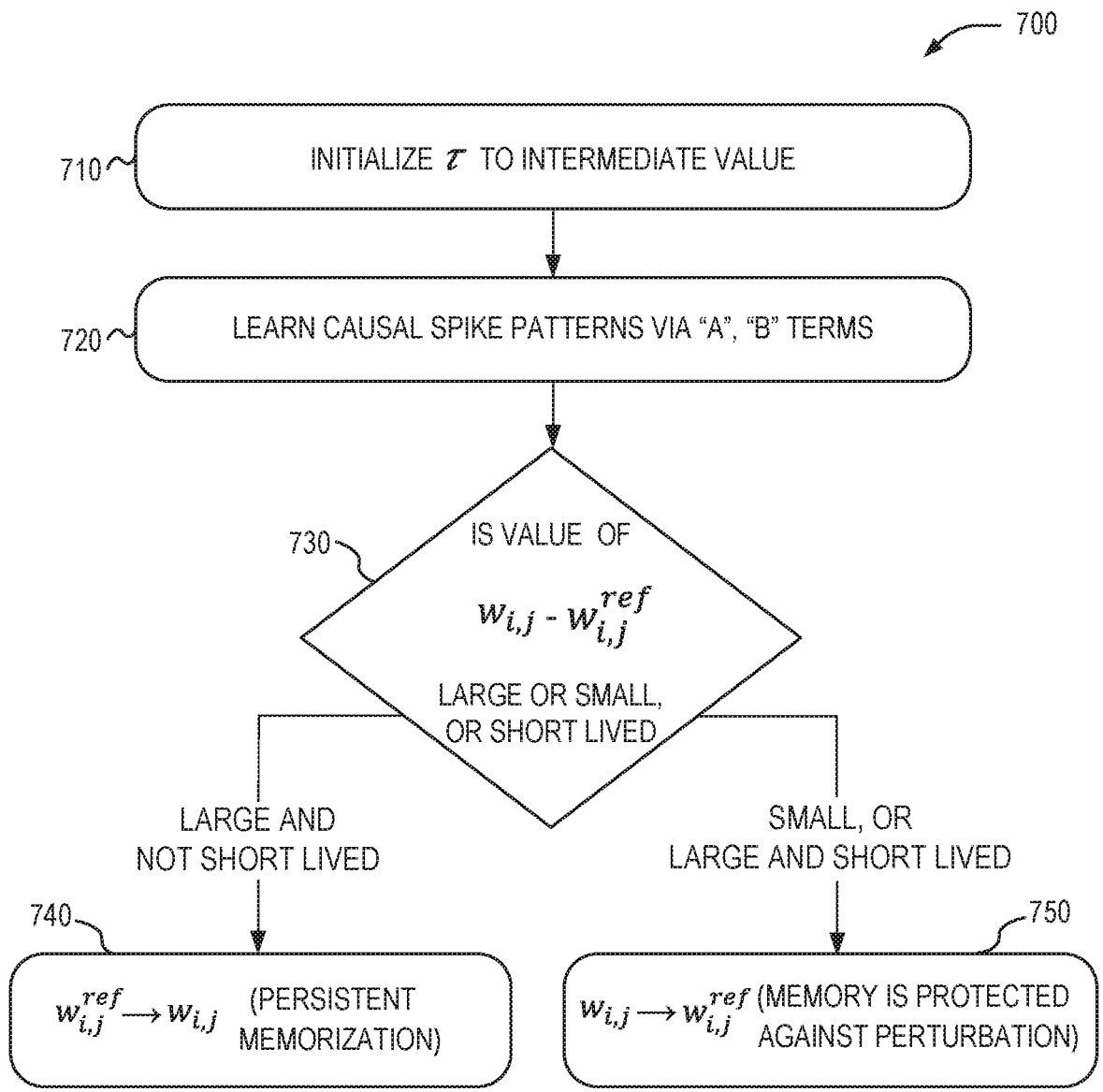
FIG. 7 illustrates a flowchart of operations applied in an unsupervised learning algorithm, according to an example.

FIG. 7 illustrates a flowchart 700 of example operations applied in an unsupervised learning algorithm. In a similar fashion as shown in flowchart 600, the reinforcement learning algorithm may implement the weight modifications depicted in FIG. 3, using correlated activity between a pre-synaptic spike train and a post-synaptic spike train to provide reinforcement of weight values updated with multistage update mechanisms.

The flowchart 700 begins operations with the initialization of a time constant, r to an intermediate value (operation 710). Next, the neural network operates to learn causal spike patterns via "A" and "B" parameter terms (operation 720), which are used to modify the subject weight applied in the weight update process (e.g., with the Stage 1 update mechanism).

Further operations in the flowchart 700 are based on the differences between the subject weight $w_{i,j}$ and the reference weight $w_{i,j}^{ref}$, such as whether the evaluated difference between the subject weight $w_{i,j}$ and the reference weight $w_{i,j}^{ref}$ is large or small (evaluation 730). If the difference is large and the effect is not short lived, then the weight value is persistently ref memorized (as $w_{i,j}^{ref} \rightarrow w_{i,j}$) (operation 740). If the evaluated difference is small, or if the evaluated difference is large but short-lived, then the weight value moves towards the reference value (as $w_{i,j} \rightarrow w_{i,j}^{ref}$) (operation 750), and the memory is protected against perturbation. Based on implementation of the equations (e.g., discussed above with reference to FIGS. 3, 4, and 5), the effect of large/long-lived versus small/short-lived on the weight dynamics will evidence an emergent property of the differential equations that is subject to event-based input. In other words, the effect unfolds over time as the network is exposed to input.

Figure 8:
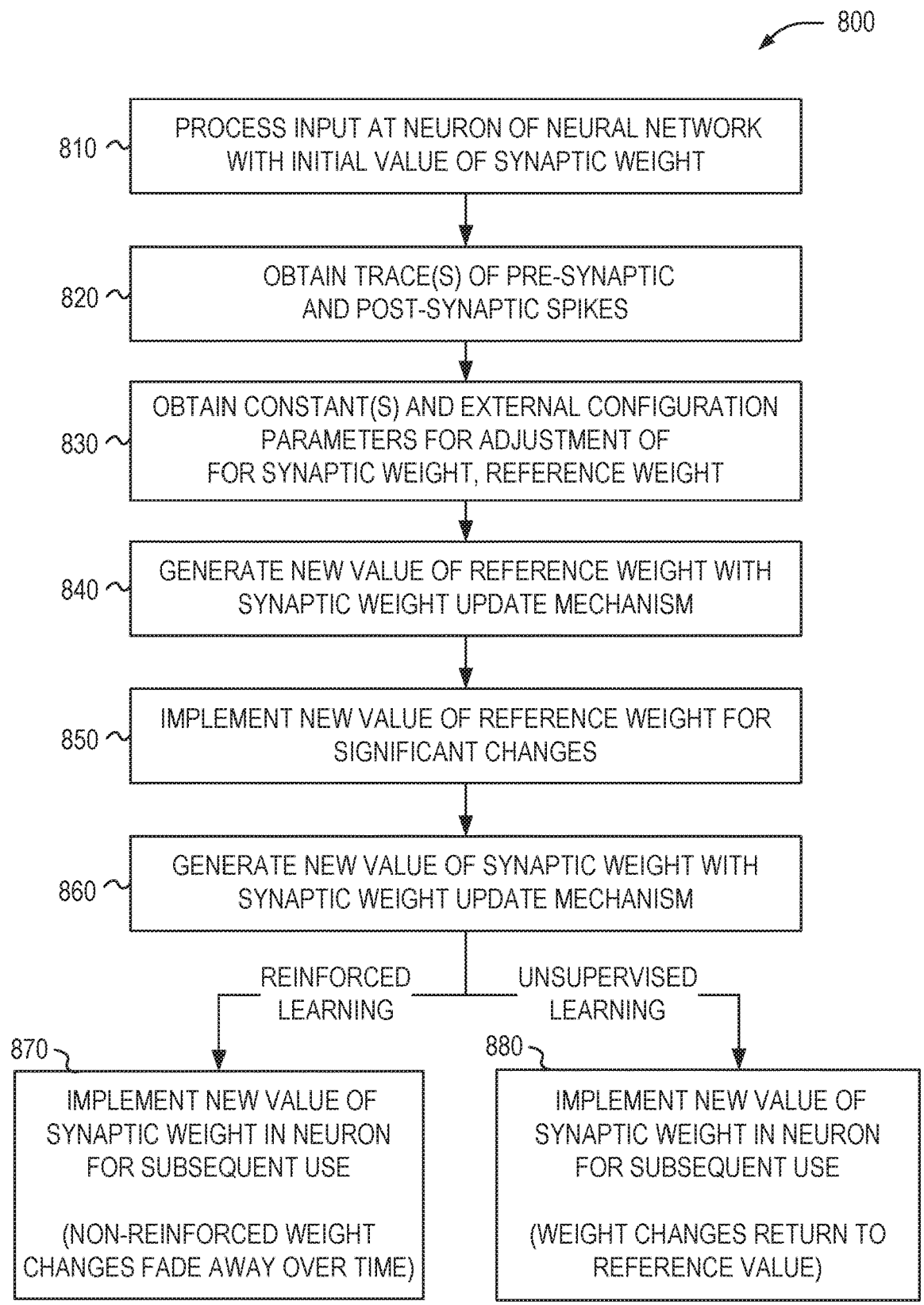
FIG. 8 illustrates a flowchart of a method for conducting learning in a neural network implementation with use of a reinforcement or unsupervised learning algorithm, according to an example.

FIG. 8 is a flowchart 800 illustrating an example method of conducting learning in a neural network implementation with use of a reinforcement learning algorithm. This method may be implemented or embodied in circuitry (hardware) designed for execution of operations, instructions, or logic, to perform the respective operations. In some examples, the method may be utilized in a neuromorphic hardware implementation of a spiking neural network. However, it will be understood that these techniques may also be implemented in software environments that simulate or approximate the operations of a spiking neural network or other forms of artificial neural network. Thus, the methods may be implemented in software or programming-based logic including with the use of software logic to execute learning, training, and processing operations of the neural network.

The flowchart 800 depicts operations for implementing learning in a spiking neural network, but it will be understood that aspects of the following operations may be modified, re-ordered, or adapted for other aspects of learning. As shown, the flowchart includes the processing of input data at a neuron of the spiking neural network (operation 810). In an example, the processing of the input includes the neuron applying a first value of a synaptic weight in response to at least one spike of a received spike train, such that the neuron causes propagation of at least one spike in a generated spike train from a synaptic connection in response to use of the synaptic weight on the received spike train. Trace values from the pre-synaptic and post-synaptic spikes are then obtained (operation 820), in addition to values from one or more constants and external configuration parameters that are used to adjust the synaptic weight and a reference weight (operation 830).

The flowchart 800 continues with the generation of a new (e.g., updated) value of the reference weight with a synaptic weight update mechanism (operation 840), and the implementation (e.g., use) of the new value of the reference weight for significant changes, such as resulting from the weight update mechanisms discussed herein. In an example, a second value of the reference weight is generated with a reference weight update process, such that the reference weight update process evaluates inputs received from: the first value of the synaptic weight, the first value of the reference weight, a time constant, and at least one reference weight configuration parameter.

The flowchart 800 continues with the generation of a new (e.g., updated) value of the synaptic weight with a synaptic weight update mechanism (operation 860), and the implementation of this new value of the synaptic weight from a reinforced learning or unsupervised learning procedure. For a reinforced learning procedure, the new value of the synaptic weight is implemented in the neuron for subsequent use, and the modification of the reference weight occurs so that non-reinforced weight changes are adapted to fade away over time (operation 870). For an unsupervised learning procedure, the new value of the synaptic weight is implemented in the neuron for subsequent use, but the modification of the reference weight occurs so that the weight changes return to the reference value (operation 880). In a first example, the reinforced learning procedure may be conducted in response to a reinforcement signal, such that the reinforcement learning in the reference weight update process includes reducing a value of the time constant and establishing the second value of the reference weight with use of the reduced value of the time constant, and such the second value of the reference weight is updated to converge to the second value of the synaptic weight. In a second example, an unsupervised learning procedure may be conducted in response to absence of the reinforcement signal, such that the unsupervised learning in the synaptic weight update process includes utilizing the value of the time constant and establishing the second value of the synaptic weight by competitive unsupervised learning, and such that the second value of the synaptic weight converges to the first value of the reference weight.

In an example, the operation of the spiking neural network discussed herein may be provided by neuromorphic computing hardware having a plurality of cores. In such scenarios, respective cores of the plurality of cores are configurable to implement respective neurons used in the spiking neural network, and spikes are used among the respective cores to communicate information on processing actions of the spiking neural network. A non-limiting illustration of a neuromorphic core architecture for a spiking neural network is provided from the following example.

Figure 9:
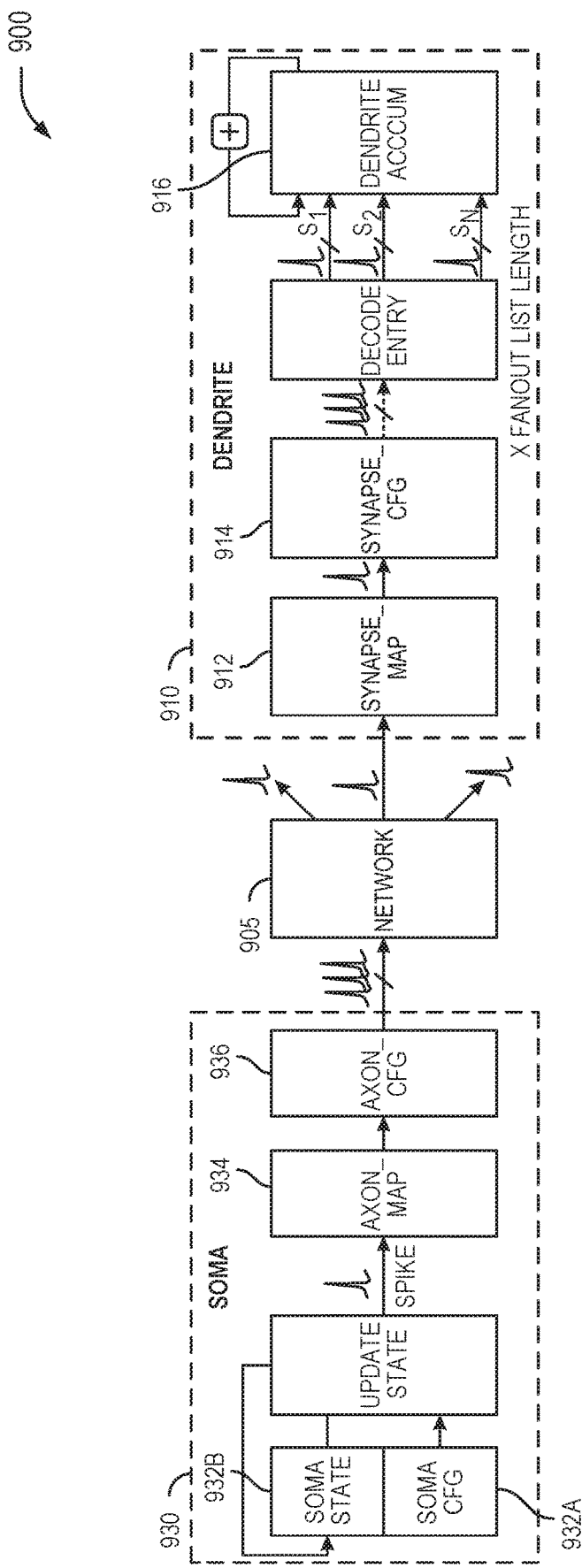
FIG. 9 illustrates a block diagram of a neuromorphic core, according to an example.

FIG. 9 is an illustrative block diagram of an example of a neuromorphic core 900. FIG. 9 also illustrates certain details of a life cycle of one neuron's spike as it propagates through the network 905, dendrite 910, and soma 930, according to an example. Communication and computation in the neuromorphic architecture occurs in an event driven manner in response to spike events as they are generated and propagated throughout the neuromorphic network. Note that the soma and dendrite components shown in FIG. 9, in general, will belong to different physical cores.

Although the spikes in FIG. 9 are illustrated as analog voltages spikes, in an actual hardware neuromorphic architecture implementation, spikes are represented digitally in different forms at different points in the pipeline. For example, when traversing the neuromorphic network, the spikes may be encoded as short data packets identifying a destination core and Axon ID.

Each stage in the spike data flow is described below.

SOMA_CFG 932A and SOMA_STATE 932B: A soma 930 spikes in response to accumulated activation value upon the occurrence of an update operation at time T. Each neuron in a core 900 has, at minimum, one entry in each of the soma CFG memory 932A and the soma STATE memory 932B. On each synchronization time step T, the configuration parameters for each neuron are read from SOMA_CFG 932A in order to receive the incoming weighted neurotransmitter amounts received from dendrites corresponding to the neuron, and to update soma state values accordingly. More particularly, each neuron's present activation state level, also referred to as its Vm membrane potential state, is read from SOMA_STATE 932B, updated based upon a corresponding accumulated dendrite value, and written back. In some embodiments, the accumulated dendrite value may be added to the stored present activation state value to produce the updated activation state level. In other embodiments, the function for integrating the accumulated dendrite value may be more complex and may involve additional state variables stored in SOMA_STATE. The updated Vm value may be compared to a threshold activation level value stored in SOMA_CFG 932A and, if Vm exceeds the threshold activation level value in an upward direction, then the soma produces an outgoing spike event. The outgoing spike event is passed to the next AXON_MAP 934 stage, at time $T+D_{axon}$, where $D_{axon}$ is a delay associated with the neuron's axon, which also is specified by SOMA_CFG 932A. At this point in the core's pipeline, the spike may be identified only by the core's neuron number that produced the spike. If the updated Vm value exceeds the threshold, then the stored activation level may be reset to an activation level of zero. If the updated Vm value does not exceed the threshold, then the updated Vm value may be stored in the SOMA_STATE memory 932B for use during a subsequent synchronization time step.

AXON_MAP 934: The spiking neuron index is mapped through the AXON_MAP memory table 934 to provide a (base_address, length) pair identifying a list of spike fanout destinations in the next table in the pipeline, the AXON_CFG 936 routing table. AXON_MAP 934 provides a level of indirection between the soma compartment index and the AXON_CFG 936 destination routing table. This allows AXON_CFG's 936 memory resources to be shared across all neurons implemented by the core in a flexible, non-uniform manner. In an alternate embodiment, the AXON_MAP 934 state is integrated into the SOMA_CFG 932A memory. However, splitting this information into a separate table saves power since the AXON_MAP 934 information is only needed when a neuron spikes, which is a relatively infrequent event.

AXON_CFG 936: Given the spike's base address and fanout list length from AXON_MAP 934, a list of (dest_core, axon_id) pairs is serially read from the AXON_CFG 936 table. Each of these becomes an outgoing spike message to the network 905, sent serially one after the other. Since each list is mapped uniquely per neuron index, some neurons may map to a large number of destinations (i.e., a multicast distribution), while others may only map to a single destination (unicast). List lengths may be arbitrarily configured as long as the total entries does not exceed the total size of the AXON_CFG 936 memory.

NETWORK 905: The network 905 routes each spike message to a destination core in a stateless, asynchronous manner. From the standpoint of the computational model, the routing happens in zero time, i.e., if the spike message is generated at time T, then it is received at the destination core at time T relative to the source core's time step. (Note: due to possible barrier synchronization non-determinism, if so configured, the destination core may receive the message at a time step $T \pm \Delta D_{BS}$, where $\Delta D_{BS}$ is the maximum barrier synchronization delay of the system.) The AxonID spike packet payload is an opaque identifier interpreted uniquely by the destination core and has no meaning to the network.

SYNAPSE_MAP 912: As each spike message is received by its destination core, the AxonID identifier from the spike message's payload is mapped through the SYNAPSE_MAP 912 table to give a (base_address, length) pair that corresponds to one or more dendrites of the neuron identified in the spike message. This lookup is directly analogous to the AXON_MAP 934 table lookup. The mapping assigns a list of local synapses that specify connections to dendrite compartments within the core. Note that each AxonID mapped by the source core's AXON_CFG 936 entry is meaningful only to the destination core, so there are no global allocation constraints on the AxonID space. In an alternative embodiment, similar to AXON_MAP 934, the (base_address, length) information mapped by SYNAPSE_MAP 912 is specified directly from AXON_CFG 936 and sent as the spike payload, instead of AxonID. However, the use of the SYNAPSE_MAP 912 indirection allows the AXON_CFG memory 936 and the spike payload to be smaller, thereby saving overall area and power for large systems.

SYNAPSE_CFG 914: Similar to AXON_CFG 936, SYNAPSE_CFG 914 is a memory of variable-length routing lists that are shared among all of the core's dendritic compartments. However, unlike AXON_CFG 936, each entry in SYNAPSE_CFG 914 has a highly configurable format. Depending on the needs of the particular neuromorphic algorithm used, formats may be specified that provide more or less information per synapse, such as higher weight and delay precision. SYNAPSE_CFG 914 is a direct-mapped table, with each mapped entry having a fixed bit width, so higher precision fields imply fewer synapses per entry, and lower precisions enable more synapses per entry. In general, each SYNAPSE_CFG 914 entry is uniquely decoded to produce a set of synaptic connections, with each synaptic connection being a (DendriteIdx, Weight, Delay) three-tuple. Hence a list of m SYNAPSE_CFG 914 entries as specified by the SYNAPSE_MAP 912 entry will become a set of $(\Sigma_{i=1}^{m} n_i)$ synaptic connections, where $n_i$ is the number of synapses in the ith SYNAPSE_CFG 914 entry in the list.

DENDRITE_ACCUM 916: Finally, each spike's synaptic connections map to counters within the dendrite compartment that maintain the sum of all weighted spikes received for future handling by soma. DENDRITE_ACCUM 916 is a two-dimensional read-modify-write memory indexed by (DendriteIdx, (T+Delay) % $D_{MAX}$). As described earlier, the T+Delay term identifies the future time step at which the soma will receive the spike. The % $D_{MAX}$ modulo operation implements a circular scheduler buffer. The read-modify-write operation simply linearly accumulates the received synaptic weight: DENDRITE_ACCUM[idx, (T+D) % $D_{MAX}$]=DENDRITE_ACCUM[idx, (T+D) % $D_{MAX}$]+W.

As described above, at each time step T, the soma 930 receives an accumulation of the total spike weight received (WeightSum) via synapses mapped to specific dendritic compartments. In the simplest embodiment, each dendritic compartment maps to a single neuron soma. Such an embodiment implements a single-compartment point neuron model, consistent with nearly all previous neuromorphic frameworks and hardware designs published to date. An extension of this architecture disclosed in a separate patent application provides support for multi-compartment neuron models.

The SOMA_CFG 932A and SOMA_STATE 932B memories serve as the basic architectural ingredients from which a large space of spiking neural network models may be implemented. Simpler models may minimize the size of these memories by modeling synaptic input responses with single-timestep current impulses, low state variable resolution with linear decay, and zero-time axon delays. More complex neuron models may implement higher resolution state variables with exponential decay, multiple resting potentials per ion channel type, additional neuron state variables for richer spiking dynamics, dynamic thresholds implementing homeostasis effects, and multiple output spike timer state for accurate burst modeling and large axonal delays. These variations in neuron model features represent choices over a spectrum of functionality localized to the soma stage in the architecture. Greater neuroscience detail costs higher SOMA_CFG 932A and SOMA_STATE 932B resources and greater logic area and power, while cruder neuroscience models require less resources and lower power. The neuromorphic architecture herein supports a very wide spectrum of such choices.

The soma configuration in some embodiments implements a simple current-based Leaky Integrate-and-Fire (LIF) neuron model. The subthreshold dynamics of the LIF neuron model are described by the following discrete-time dimensionless differential equations:

$$u[t] = \left(1 - \frac{1}{\tau_s}\right)u[t-1] + \sum_{i \in I} w_i s_i[t]$$

$$v[t] = \left(1 - \frac{1}{\tau_m}\right)v[t-1] + u[t] + b$$

where:
i. $\Sigma_s$ and $\Sigma_m$ are synaptic and membrane time constants, respectively;
ii. I is the set of fanin synapses for the neuron;
iii. $w_i$ is the weight of synapse i;
iv. $s_i[t]$ is the count of spikes received for time step t at synapse i, after accounting for synaptic delays; and
v. b is a constant bias current.

For computational efficiency, the exponential scalings are configured and scaled according to the following fixed-point approximation:

$$\left(1 - \frac{1}{\tau}\right) \approx \frac{4096 - D}{4096}$$

where the D decay constants ($D_s$ and $D_m$) can range over [0,4096], corresponding to $\tau$ time constants nonlinearly spaced over the range [1, ∞].

When the membrane voltage v[t] passes some fixed threshold θ from below, the neuron schedules an output spike for t+$T_{axon}$ based on a constant configured axon delay ($T_{axon} \in [0,15]$), and v[t] is mapped to 0. The membrane potential is held at 0 until t+$T_{ref}$ where $T_{ref}$ is the refractory delay, which may be specified as a constant in SOMA_CFG 932A or configured to be pseudorandomly generated.

Due to the high connectivity fanouts in neuromorphic architectures, the state associated with synaptic connections dominates the physical cost of hardware realizations of spiking neural networks. Mammalian neurons commonly have on the order of 10,000 synapses. A synapse generally can be reasonably modeled with a small number of bits, on the order of eight to fifty less state and configuration needed for the LIF soma state. Thus in a biologically faithful hardware implementation with 10,000 synapses per neuron, where all of these parameters are either uniquely programmable or dynamic, synaptic state dominates by a factor of well over 200.

Furthermore, depending on the synaptic neural network algorithmic application used by the neuromorphic network, the range of fanouts per neuron and the range of synaptic state may vary considerably. For example, some pattern matching algorithms call for only a single bit of weight precision per synapse, whereas others require real-valued connectivity weights encoded with up to eight bits per synapse. Other algorithmic features such as temporal coding, polychronous computation, and dynamic learning can add considerably more state per synapse. The synaptic connectivity of some algorithms have simple all-to-all connectivity between the neurons which can be simply specified in dense matrix form. Many other algorithms assume sparse connectivity between neurons, or by some dynamic pruning process converge to a sparse network that cannot be represented efficiently with dense matrices. All told, the amount of desired state per synapse can span over a range of 10× and higher, depending on the application need.

The neuromorphic architecture described herein advantageously supports a broad range of such synaptic connectivity models. The neuromorphic architecture described herein leaves it up to software to program the desired level of synaptic precision and mapping flexibility, subject to total memory size constraints.

The capability to support a wide range of synaptic connectivity models arises from the following ingredients.

The SYNAPSE_MAP/SYNAPSE_CFG 912/914 and AXON_MAP/AXON_CFG 934/936 pairs of mapping tables on each core's ingress and egress sides, respectively. Each pair's MAP table provides the indirection needed to allocate variable-length connectivity lists anywhere in the subsequent CFG memory. This allows the CFG memory entries to be shared among the neural resources contained within the core.

Each memory address of SYNAPSE_CFG 914 maps to an entry whose format is explicitly specified by the entry itself. For example, in some neuromorphic network embodiments, only bits 2:0 have a fixed interpretation over all SYNAPSE_CFG 914 entries. This field specifies one of eight formats over the rest of the bits in the entry. Depending on the entry type, different precisions of synaptic parameters are encoded. Entry formats with lower precision parameters support more synapses, while higher precision parameters may be specified if desired at the expense of fewer synapses in the entry.

Similarly, the entries in the AXON_CFG 936 memory may likewise encode different spike message types. This allows spikes traveling shorter distances from the source core to consume fewer resources since the information required to identify a destination core increases with its distance. In particular, spikes destined to cores physically located on different integrated circuit chips may require a hierarchical address, with the higher-level hierarchical portion of the address stored in an additional AXON_CFG 936 entries.

Since the space of useful encoding formats may exceed the number of formats any particular core typically needs, further indirection in the format determination provides additional flexibility with lower hardware cost. The TYPE field (bits 2:0) described above may index a global SYNAPSE_CFG_FORMAT table that parametrically maps the three-bit field to a richer encoding format specified by many more bits.

In order to normalize different ranges of parameter values across the variable precisions of different SYNAPSE_CFG 914 entries, each format has a further programmable indirection table associated with it. For example, if the native DENDRITE_ACCUM 916 input bit width is 8 bits, then a 1-bit synaptic weight W from a SYNAPSE_CFG 914 entry may be mapped through a two-entry, 8b-valued table to give the full-precision values associated with the '0' and '1' programmed W values.

Embodiments used to facilitate and perform the techniques described herein may be implemented in one or a combination of hardware, firmware, and software. Embodiments may also be implemented as instructions stored on a machine-readable storage medium, which may be read and executed by at least one processor to perform the operations described herein. A machine-readable storage medium may include any non-transitory mechanism for storing information in a form readable by a machine (e.g., a computer). For example, a machine-readable storage device may include aspects of read-only memory (ROM), random-access memory (RAM), magnetic disk storage media, optical storage media, flash-memory devices, and other storage devices and media.

It should be understood that the functional units or capabilities described in this specification may have been referred to or labeled as components, modules, or mechanisms, in order to more particularly emphasize their implementation independence. Such components may be embodied by any number of software or hardware forms. For example, a component or module may be implemented as a hardware circuit comprising custom very-large-scale integration (VLSI) circuits or gate arrays, semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Examples, as described herein, may include, or may operate by, logic or a number of components, or mechanisms, including circuit sets and circuitry combinations. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a method of implementing learning in a spiking neural network, the method comprising electronic operations including: processing an input at a neuron of the spiking neural network, wherein the processing includes the neuron applying a first value of a synaptic weight in response to at least one spike of a received spike train, and wherein the neuron causes propagation of at least one spike in a generated spike train from a synaptic connection in response to use of the synaptic weight on the received spike train; generating a second value of the synaptic weight with a synaptic weight update process, wherein the synaptic weight update process evaluates values received from: the first value of the synaptic weight, a first value of a reference weight, at least one synaptic weight configuration parameter, at least one trace of the spikes in the received spike train, and at least one trace of the spikes in the generated spike train; and generating a second value of the reference weight with a reference weight update process, wherein the reference weight update process evaluates inputs received from: the first value of the synaptic weight, the first value of the reference weight, a time constant, and at least one reference weight configuration parameter.

In Example 2, the subject matter of Example 1 optionally includes the electronic operations further including: in response to a reinforcement signal, performing reinforcement learning in the reference weight update process, wherein the reinforcement learning in the reference weight update process includes reducing a value of the time constant and establishing the second value of the reference weight with use of the reduced value of the time constant, wherein the second value of the reference weight is updated to converge to the second value of the synaptic weight.

In Example 3, the subject matter of Example 2 optionally includes the electronic operations further including: in response to absence of the reinforcement signal, performing unsupervised learning in the synaptic weight update process, wherein the unsupervised learning in the synaptic weight update process includes utilizing the value of the time constant and establishing the second value of the synaptic weight by competitive unsupervised learning, wherein the second value of the synaptic weight converges to the first value of the reference weight.

In Example 4, the subject matter of any one or more of Examples 1-3 optionally include the electronic operations further including: obtaining respective values of: the at least one synaptic weight configuration parameter, the at least one reference weight configuration parameter, and the time constant; and wherein the time constant is initialized to an intermediate value.

In Example 5, the subject matter of any one or more of Examples 1-4 optionally include the electronic operations further including: evaluating a difference between the first value of the synaptic weight and the first value of the reference weight; wherein, in response to the difference exceeding a significance threshold, the second value of the reference weight is generated to change in a direction towards the first value of the synaptic weight; and wherein, in response to the difference not exceeding the significance threshold, the second value of the synaptic weight is generated to change in a direction towards the first value of the reference weight.

In Example 6, the subject matter of any one or more of Examples 1-5 optionally include wherein the reference weight update process operates to determine the second value of the reference weight based on changes to the reference weight over time, based on the time constant and the at least one reference weight configuration parameter.

In Example 7, the subject matter of any one or more of Examples 1-6 optionally include wherein the synaptic weight update process operates to determine the second value of the synaptic weight based on weight normalization and a movement in a direction of first value of the reference weight, based on a drift force and a relaxation force.

In Example 8, the subject matter of any one or more of Examples 1-7 optionally include wherein the spikes in the received spike train are provided from a first plurality of neurons in the spiking neural network, and wherein the spikes in the generated spike train are provided to a second plurality of neurons in the spiking neural network.

In Example 9, the subject matter of any one or more of Examples 1-8 optionally include wherein the spiking neural network is provided by neuromorphic computing hardware having a plurality of cores, wherein respective cores of the plurality of cores are configurable to implement respective neurons used in the spiking neural network, and wherein spikes are used among the respective cores to communicate information on processing actions of the spiking neural network.

Example 10 is a computing device configured for implementing learning in a neuron of a spiking neural network, the computing device comprising circuitry to: process an input at a neuron of the spiking neural network, wherein the processing includes the neuron applying a first value of a synaptic weight in response to at least one spike of a received spike train, and wherein the neuron causes propagation of at least one spike in a generated spike train from a synaptic connection in response to use of the synaptic weight on the received spike train; generate a second value of the synaptic weight with a synaptic weight update process, wherein the synaptic weight update process evaluates values received from: the first value of the synaptic weight, a first value of a reference weight, at least one synaptic weight configuration parameter, at least one trace of the spikes in the received spike train, and at least one trace of the spikes in the generated spike train; and generate a second value of the reference weight with a reference weight update process, wherein the reference weight update process evaluates inputs received from: the first value of the synaptic weight, the first value of the reference weight, a time constant, and at least one reference weight configuration parameter.

In Example 11, the subject matter of Example 10 optionally includes the circuitry further to: perform reinforcement learning in the reference weight update process, in response to a reinforcement signal, wherein the reinforcement learning in the reference weight update process includes reduction of a value of the time constant and establishment of the second value of the reference weight with use of the reduced value of the time constant, wherein the second value of the reference weight is updated to converge to the second value of the synaptic weight.

In Example 12, the subject matter of Example 11 optionally includes the circuitry further to: perform unsupervised learning in the synaptic weight update process, in response to absence of the reinforcement signal, wherein the unsupervised learning in the synaptic weight update process includes use of the value of the time constant and establishment of the second value of the synaptic weight by competitive unsupervised learning, wherein the second value of the synaptic weight converges to the first value of the reference weight.

In Example 13, the subject matter of any one or more of Examples 10-12 optionally include the circuitry further to: obtain respective values of: the at least one synaptic weight configuration parameter, the at least one reference weight configuration parameter, and the time constant; and wherein the time constant is initialized to an intermediate value.

In Example 14, the subject matter of any one or more of Examples 10-13 optionally include the circuitry further to: evaluate a difference between the first value of the synaptic weight and the first value of the reference weight; wherein, in response to the difference exceeding a significance threshold, the second value of the reference weight is generated to change in a direction towards the first value of the synaptic weight: and wherein, in response to the difference not exceeding the significance threshold, the second value of the synaptic weight is generated to change in a direction towards the first value of the reference weight.

In Example 15, the subject matter of any one or more of Examples 10-14 optionally include the circuitry further to: determine the second value of the reference weight, with the reference weight update process, from changes to the reference weight over time, based on the time constant and the at least one reference weight configuration parameter.

In Example 16, the subject matter of any one or more of Examples 10-15 optionally include the circuitry further to: determine the second value of the synaptic weight, with the synaptic weight update process, from weight normalization and a movement in a direction of first value of the reference weight, based on a drift force and a relaxation force.

In Example 17, the subject matter of any one or more of Examples 10-16 optionally include wherein the spikes in the received spike train are provided from a first plurality of neurons in the spiking neural network, and wherein the spikes in the generated spike train are provided to a second plurality of neurons in the spiking neural network.

In Example 18, the subject matter of any one or more of Examples 10-17 optionally include wherein the spiking neural network is provided by neuromorphic computing hardware having a plurality of cores, wherein respective cores of the plurality of cores are configurable to implement respective neurons used in the spiking neural network, and wherein spikes are used among the respective cores to communicate information on processing actions of the spiking neural network.

Example 19 is a method of learning implemented in a spiking neural network, comprising: receiving a first spike at a neuron of the spiking neural network applying a first weight to the first spike and forwarding the first spike to a nucleus of the neuron; updating the first weight for processing of a second spike received at the neuron of the spiking neural network, wherein the first weight is updated based on a result of the forwarding and a second weight; and updating the second weight based on the first weight, wherein the second weight is a reference weight.

In Example 20, the subject matter of Example 19 optionally includes receiving a reinforcement signal for reinforcement of the first spike, wherein, in response to the reinforcement signal, the second weight is updated to converge to the updated first weight.

In Example 21, the subject matter of any one or more of Examples 19-20 optionally include wherein updating the first weight includes updating the first weight to converge to the second weight.

In Example 22, the subject matter of any one or more of Examples 19-21 optionally include wherein updating the first weight further includes updating the first weight based on a configuration parameter.

In Example 23, the subject matter of any one or more of Examples 19-22 optionally include wherein updating the second weight further includes updating the second weight based on a time constant and a configuration parameter.

In Example 24, the subject matter of any one or more of Examples 19-23 optionally include wherein the nucleus of the neuron is configured to activate in response to values from a plurality of spikes including the first spike and the second spike exceeding a threshold.

In Example 25, the subject matter of any one or more of Examples 19-24 optionally include wherein the spiking neural network is provided by neuromorphic computing hardware having a plurality of cores, wherein respective cores of the plurality of cores are configurable to implement respective neurons used in the spiking neural network, and wherein spikes are used among the respective cores to communicate information on processing actions of the spiking neural network.

Example 26 is a computing device configured for implementing learning in a neuron weight used in a spiking neural network, the computing device comprising circuitry to: receive a first spike at a neuron of the spiking neural network; apply a first weight to the first spike and forwarding the first spike to a nucleus of the neuron; update the first weight for processing of a second spike received at the neuron of the spiking neural network, wherein the first weight is updated based on a result of the forwarding and a second weight; and update the second weight based on the first weight, wherein the second weight is a reference weight.

In Example 27, the subject matter of Example 26 optionally includes the computing device further comprising circuitry to: receive a reinforcement signal for reinforcement of the first spike; wherein, in response to the reinforcement signal, the second weight is updated to converge to the updated first weight.

In Example 28, the subject matter of any one or more of Examples 26-27 optionally include wherein operations enabled by the circuitry to update the first weight include operations to update the first weight to converge to the second weight.

In Example 29, the subject matter of any one or more of Examples 26-28 optionally include wherein operations enabled by the circuitry to update the first weight include operations to update the first weight based on a configuration parameter.

In Example 30, the subject matter of any one or more of Examples 26-29 optionally include wherein operations enabled by the circuitry to update the second weight include operations to update the second weight based on a time constant and a configuration parameter.

In Example 31, the subject matter of any one or more of Examples 26-30 optionally include wherein the nucleus of the neuron is configured to activate in response to values from a plurality of spikes including the first spike and the second spike exceeding a threshold.

In Example 32, the subject matter of any one or more of Examples 26-31 optionally include wherein the computing device includes neuromorphic hardware components to implement the spiking neural network among a plurality of cores, wherein respective cores of the plurality of cores are configurable to implement respective neurons used in the spiking neural network, and wherein spikes are used among the respective cores to communicate information on processing actions of the spiking neural network.

Example 33 is a neuromorphic computing system, comprising: neuromorphic computing hardware, wherein the neuromorphic computing hardware is configurable to implement respective neurons used in a spiking neural network, and wherein spikes are used to communicate information of processing actions of the spiking neural network, and wherein the neuromorphic computing hardware supports learning operations with the respective neurons used in the spiking neural network that: process an input at a neuron of the spiking neural network, wherein the processing includes the neuron applying a first value of a synaptic weight in response to at least one spike of a received spike train, and wherein the neuron causes propagation of at least one spike in a generated spike train from a synaptic connection in response to use of the synaptic weight on the received spike train; generate a second value of the synaptic weight with a synaptic weight update process, wherein the synaptic weight update process evaluates values received from: the first value of the synaptic weight, a first value of a reference weight, at least one synaptic weight configuration parameter, at least one trace of the spikes in the received spike train, and at least one trace of the spikes in the generated spike train; and generate a second value of the reference weight with a reference weight update process, wherein the reference weight update process evaluates inputs received from: the first value of the synaptic weight, the first value of the reference weight, a time constant, and at least one reference weight configuration parameter.

In Example 34, the subject matter of Example 33 optionally includes the neuromorphic computing hardware further to implement learning operations that: perform reinforcement learning in the reference weight update process, in response to a reinforcement signal, wherein the reinforcement learning in the reference weight update process includes reduction of a value of the time constant and establishment of the second value of the reference weight with use of the reduced value of the time constant, wherein the second value of the reference weight is updated to converge to the second value of the synaptic weight.

In Example 35, the subject matter of Example 34 optionally includes the neuromorphic computing hardware further to implement learning operations that: perform unsupervised learning in the synaptic weight update process, in response to absence of the reinforcement signal, wherein the unsupervised learning in the synaptic weight update process includes use of the value of the time constant and establishment of the second value of the synaptic weight by competitive unsupervised learning, wherein the second value of the synaptic weight converges to the first value of the reference weight.

In Example 36, the subject matter of any one or more of Examples 33-35 optionally include the neuromorphic computing hardware further to implement learning operations that: obtain respective values of: the at least one synaptic weight configuration parameter, the at least one reference weight configuration parameter, and the time constant; and wherein the time constant is initialized to an intermediate value.

In Example 37, the subject matter of any one or more of Examples 33-36 optionally include the neuromorphic computing hardware further to implement learning operations that: evaluate a difference between the first value of the synaptic weight and the first value of the reference weight; wherein, in response to the difference exceeding a significance threshold, the second value of the reference weight is generated to change in a direction towards the first value of the synaptic weight; and wherein, in response to the difference not exceeding the significance threshold, the second value of the synaptic weight is generated to change in a direction towards the first value of the reference weight.

In Example 38, the subject matter of any one or more of Examples 33-37 optionally include the neuromorphic computing hardware further to implement learning operations that: determine the second value of the reference weight, with the reference weight update process, from changes to the reference weight over time, based on the time constant and the at least one reference weight configuration parameter.

In Example 39, the subject matter of any one or more of Examples 33-38 optionally include the neuromorphic computing hardware further to implement learning operations that: determine the second value of the synaptic weight, with the synaptic weight update process, from weight normalization and a movement in a direction of first value of the reference weight, based on a drift force and a relaxation force.

In Example 40, the subject matter of any one or more of Examples 33-39 optionally include wherein the spikes in the received spike train are provided from a first plurality of neurons in the spiking neural network, and wherein the spikes in the generated spike train are provided to a second plurality of neurons in the spiking neural network.

Example 41 is a neuromorphic computing system, comprising: neuromorphic computing hardware, wherein the neuromorphic computing hardware is configurable to implement respective neurons used in a spiking neural network, and wherein spikes are used to communicate information of processing actions of the spiking neural network, and wherein the neuromorphic computing hardware supports learning operations with the respective neurons used in the spiking neural network that: receive a first spike at a neuron of the spiking neural network; apply a first weight to the first spike and forwarding the spike to a nucleus of the neuron; update the first weight for processing of a second spike received at the neuron of the spiking neural network, wherein the first weight is updated based on a result of the forwarding and a second weight; and update the second weight based on the first weight, wherein the second weight is a reference weight.

In Example 42, the subject matter of Example 41 optionally includes the neuromorphic computing hardware further to implement learning operations that: receive a reinforcement signal for reinforcement of the first spike; wherein, in response to the reinforcement signal, the second weight is updated to converge to the updated first weight.

In Example 43, the subject matter of any one or more of Examples 41-42 optionally include wherein operations enabled by the neuromorphic computing hardware to update the first weight include operations to update the first weight to converge to the second weight.

In Example 44, the subject matter of any one or more of Examples 41-43 optionally include wherein operations enabled by the neuromorphic computing hardware to update the first weight include operations to update the first weight based on a configuration parameter.

In Example 45, the subject matter of any one or more of Examples 41-44 optionally include wherein operations enabled by the neuromorphic computing hardware to update the second weight include operations to update the second weight based on a time constant and a configuration parameter.

In Example 46, the subject matter of any one or more of Examples 41-45 optionally include wherein the nucleus of the neuron is configured to activate with the neuromorphic computing hardware in response to values from a plurality of spikes including the first spike and the second spike exceeding a threshold.

Example 47 is at least one machine readable medium including instructions, which when executed by a computing system, cause the computing system to perform any of the methods of Examples 1-10 or 19-25.

Example 48 is at least one machine-readable storage medium, comprising a plurality of instructions adapted for implementing learning of a neuron weight used in a spiking neural network, wherein the instructions, responsive to being executed with processor circuitry of a computing machine, cause the computing machine to perform operations that: process an input at a neuron of the spiking neural network, wherein the processing includes the neuron applying a first value of a synaptic weight in response to at least one spike of a received spike train, and wherein the neuron causes propagation of at least one spike in a generated spike train from a synaptic connection in response to use of the synaptic weight on the received spike train; generate a second value of the synaptic weight with a synaptic weight update process, wherein the synaptic weight update process evaluates values received from: the first value of the synaptic weight, a first value of a reference weight, at least one synaptic weight configuration parameter, at least one trace of the spikes in the received spike train, and at least one trace of the spikes in the generated spike train; and generate a second value of the reference weight with a reference weight update process, wherein the reference weight update process evaluates inputs received from: the first value of the synaptic weight, the first value of the reference weight, a time constant, and at least one reference weight configuration parameter.

In Example 49, the subject matter of Example 48 optionally includes the instructions further to cause the computing machine to perform operations that: perform reinforcement learning in the reference weight update process, in response to a reinforcement signal, wherein the reinforcement learning in the reference weight update process includes reduction of a value of the time constant and establishment of the second value of the reference weight with use of the reduced value of the time constant, wherein the second value of the reference weight is updated to converge to the second value of the synaptic weight.

In Example 50, the subject matter of Example 49 optionally includes the instructions further to cause the computing machine to perform operations that: perform unsupervised learning in the synaptic weight update process, in response to absence of the reinforcement signal, wherein the unsupervised learning in the synaptic weight update process includes use of the value of the time constant and establishment of the second value of the synaptic weight by competitive unsupervised learning, wherein the second value of the synaptic weight converges to the first value of the reference weight.

In Example 51, the subject matter of any one or more of Examples 48-50 optionally include the instructions further to cause the computing machine to perform operations that: obtain respective values of: the at least one synaptic weight configuration parameter, the at least one reference weight configuration parameter, and the time constant; and wherein the time constant is initialized to an intermediate value.

In Example 52, the subject matter of any one or more of Examples 48-51 optionally include the instructions further to cause the computing machine to perform operations that: evaluate a difference between the first value of the synaptic weight and the first value of the reference weight; wherein, in response to the difference exceeding a significance threshold, the second value of the reference weight is generated to change in a direction towards the first value of the synaptic weight; and wherein, in response to the difference not exceeding the significance threshold, the second value of the synaptic weight is generated to change in a direction towards the first value of the reference weight.

In Example 53, the subject matter of any one or more of Examples 48-52 optionally include the instructions further to cause the computing machine to perform operations that: determine the second value of the reference weight, with the reference weight update process, from changes to the reference weight over time, based on the time constant and the at least one reference weight configuration parameter.

In Example 54, the subject matter of any one or more of Examples 48-53 optionally include the instructions further to cause the computing machine to perform operations that: determine the second value of the synaptic weight, with the synaptic weight update process, from weight normalization and a movement in a direction of first value of the reference weight, based on a drift force and a relaxation force.

In Example 55, the subject matter of any one or more of Examples 48-54 optionally include wherein the spikes in the received spike train are provided from a first plurality of neurons in the spiking neural network, and wherein the spikes in the generated spike train are provided to a second plurality of neurons in the spiking neural network.

In Example 56, the subject matter of any one or more of Examples 48-55 optionally include wherein the spiking neural network is provided by neuromorphic computing hardware having a plurality of cores, wherein respective cores of the plurality of cores are configurable to implement respective neurons used in the spiking neural network, and wherein spikes are used among the respective cores to communicate information on processing actions of the spiking neural network.

Example 57 is at least one machine-readable storage medium, comprising a plurality of instructions adapted for implementing learning of a neuron weight used in a spiking neural network, wherein the instructions, responsive to being executed with processor circuitry of a computing machine, cause the computing machine to perform operations that: receive a first spike at a neuron of the spiking neural network; apply a first weight to the first spike and forwarding the first spike to a nucleus of the neuron; update the first weight for processing of a second spike received at the neuron of the spiking neural network, wherein the first weight is updated based on a result of the forwarding and a second weight; and update the second weight based on the first weight, wherein the second weight is a reference weight.

In Example 58, the subject matter of Example 57 optionally includes the instructions further to cause the computing machine to perform operations that: receive a reinforcement signal for reinforcement of the first spike; wherein, in response to the reinforcement signal, the second weight is updated to converge to the updated first weight.

In Example 59, the subject matter of any one or more of Examples 57-58 optionally include wherein operations to update the first weight include operations to update the first weight to converge to the second weight.

In Example 60, the subject matter of any one or more of Examples 57-59 optionally include wherein operations to update the first weight include operations to update the first weight based on a configuration parameter.

In Example 61, the subject matter of any one or more of Examples 57-60 optionally include wherein operations to update the second weight include operations to update the second weight based on a time constant and a configuration parameter.

In Example 62, the subject matter of any one or more of Examples 57-61 optionally include wherein the nucleus of the neuron is configured to activate in response to values from a plurality of spikes including the first spike and the second spike exceeding a threshold.

In Example 63, the subject matter of any one or more of Examples 57-62 optionally include wherein the computing machine includes neuromorphic hardware components to implement the spiking neural network among a plurality of cores, wherein respective cores of the plurality of cores are configurable to implement respective neurons used in the spiking neural network, and wherein spikes are used among the respective cores to communicate information on processing actions of the spiking neural network.

Example 64 is an apparatus comprising means for performing any of the methods of Examples 1-10 or Examples 19-25.

Example 65 is an apparatus, comprising: means for processing an input at a neuron of a spiking neural network, wherein the processing includes the neuron applying a first value of a synaptic weight in response to at least one spike of a received spike train, and wherein the neuron causes propagation of at least one spike in a generated spike train from a synaptic connection in response to use of the synaptic weight on the received spike train; means for generating a second value of the synaptic weight with a synaptic weight update process, wherein the synaptic weight update process evaluates values received from: the first value of the synaptic weight, a first value of a reference weight, at least one synaptic weight configuration parameter, at least one trace of the spikes in the received spike train, and at least one trace of the spikes in the generated spike train; and means for generating a second value of the reference weight with a reference weight update process, wherein the reference weight update process evaluates inputs received from: the first value of the synaptic weight, the first value of the reference weight, a time constant, and at least one reference weight configuration parameter.

In Example 66, the subject matter of Example 65 optionally includes means for performing reinforcement learning with the reference weight update process in response to a reinforcement signal, wherein the reinforcement learning in the reference weight update process includes reducing a value of the time constant and establishing the second value of the reference weight with use of the reduced value of the time constant, wherein the second value of the reference weight is updated to converge to the second value of the synaptic weight.

In Example 67, the subject matter of Example 66 optionally includes means for performing unsupervised learning with the synaptic weight update process in response to absence of the reinforcement signal, wherein the unsupervised learning in the synaptic weight update process includes utilizing the value of the time constant and establishing the second value of the synaptic weight by competitive unsupervised learning, wherein the second value of the synaptic weight converges to the first value of the reference weight.

In Example 68, the subject matter of any one or more of Examples 65-67 optionally include means for obtaining respective values of: the at least one synaptic weight configuration parameter, the at least one reference weight configuration parameter, and the time constant; and wherein the time constant is initialized to an intermediate value.

In Example 69, the subject matter of any one or more of Examples 65-68 optionally include means for evaluating a difference between the first value of the synaptic weight and the first value of the reference weight; means for generating the second value of the reference weight, in response to the difference exceeding a significance threshold, to change the second value of the reference weight in a direction towards the first value of the synaptic weight; and means for generating the second value of the synaptic weight, in response to the difference not exceeding the significance threshold, to change the second value of the synaptic weight in a direction towards the first value of the reference weight.

In Example 70, the subject matter of any one or more of Examples 65-69 optionally include means for determining the second value of the reference weight based on changes to the reference weight over time, based on the time constant and the at least one reference weight configuration parameter.

In Example 71, the subject matter of any one or more of Examples 65-70 optionally include means for determining the second value of the synaptic weight based on weight normalization and a movement in a direction of first value of the reference weight, and based on a drift force and a relaxation force.

In Example 72, the subject matter of any one or more of Examples 65-71 optionally include wherein the spikes in the received spike train are provided from a first plurality of neurons in the spiking neural network, and wherein the spikes in the generated spike train are provided to a second plurality of neurons in the spiking neural network.

In Example 73, the subject matter of any one or more of Examples 65-72 optionally include wherein the spiking neural network is provided by neuromorphic computing hardware having a plurality of cores, wherein respective cores of the plurality of cores are configurable to implement respective neurons used in the spiking neural network, and wherein spikes are used among the respective cores to communicate information on processing actions of the spiking neural network.

Example 74 is an apparatus, comprising: means for receiving a first spike at a neuron of a spiking neural network; means for applying a first weight to the first spike and forwarding the first spike to a nucleus of the neuron; means for updating the first weight for processing of a second spike received at the neuron of the spiking neural network, wherein the first weight is updated based on a result of the forwarding and a second weight; and means for updating the second weight based on the first weight, wherein the second weight is a reference weight.

In Example 75, the subject matter of Example 74 optionally includes means for receiving a reinforcement signal for reinforcement of the first spike; and means for updating the second weight, in response to the reinforcement signal, to converge to the updated first weight.

In Example 76, the subject matter of any one or more of Examples 74-75 optionally include means for updating the first weight by updating the first weight to converge to the second weight.

In Example 77, the subject matter of any one or more of Examples 74-76 optionally include means for updating the first weight by updating the first weight based on a configuration parameter.

In Example 78, the subject matter of any one or more of Examples 74-77 optionally include means for updating the second weight by updating the second weight based on a time constant and a configuration parameter.

In Example 79, the subject matter of any one or more of Examples 74-78 optionally include means for activating the nucleus of the neuron in response to values from a plurality of spikes including the first spike and the second spike exceeding a threshold.

In Example 80, the subject matter of any one or more of Examples 74-79 optionally include wherein the spiking neural network is provided by neuromorphic computing hardware having a plurality of cores, wherein respective cores of the plurality of cores are configurable to implement respective neurons used in the spiking neural network, and wherein spikes are used among the respective cores to communicate information on processing actions of the spiking neural network.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. At least one non-transitory machine readable medium including instructions for learning in a spiking neural network, the instructions, when executed by a machine, cause the machine to perform operations comprising:
   processing an input at a neuron of the spiking neural network, wherein the processing includes the neuron applying a first value of a synaptic weight in response to at least one spike of a received spike train, and wherein the neuron causes propagation of at least one spike in a generated spike train from a synaptic connection in response to use of the synaptic weight on the received spike train;
   generating a second value of the synaptic weight with a synaptic weight update process, wherein the synaptic weight update process evaluates values received from: the first value of the synaptic weight, a first value of a reference weight, at least one synaptic weight configuration parameter, at least one trace of the spikes in the received spike train, and at least one trace of the spikes in the generated spike train;
   generating a second value of the reference weight with a reference weight update process, wherein the reference weight update process evaluates inputs received from: the first value of the synaptic weight, the first value of the reference weight, a time constant, and at least one reference weight configuration parameter; and
   evaluating a difference between the first value of the synaptic weight and the first value of the reference weight;
   wherein, in response to the difference exceeding a significance threshold, the second value of the reference weight is generated to change in a direction towards the first value of the synaptic weight; and
   wherein, in response to the difference not exceeding the significance threshold, the second value of the synaptic weight is generated to change in a direction towards the first value of the reference weight.

2. The at least one non-transitory machine readable medium of claim 1, the operations further comprising:
   in response to a reinforcement signal, performing reinforcement learning in the reference weight update process, wherein the reinforcement learning in the reference weight update process includes reducing a value of the time constant and establishing the second value of the reference weight with use of the reduced value of the time constant, wherein the second value of the reference weight is updated to converge to the second value of the synaptic weight.

3. The at least one non-transitory machine readable medium of claim 2, the operations further comprising:
   in response to absence of the reinforcement signal, performing unsupervised learning in the synaptic weight update process, wherein the unsupervised learning in the synaptic weight update process includes utilizing the value of the time constant and establishing the second value of the synaptic weight by competitive unsupervised learning, wherein the second value of the synaptic weight converges to the first value of the reference weight.

4. The at least one non-transitory machine readable medium of claim 1, the operations further comprising:
   obtaining respective values of: the at least one synaptic weight configuration parameter, the at least one reference weight configuration parameter, and the time constant; and
   wherein the time constant is initialized to an intermediate value.

5. The at least one non-transitory machine readable medium of claim 1, wherein the reference weight update process operates to determine the second value of the reference weight based on changes to the reference weight over time, based on the time constant and the at least one reference weight configuration parameter.

6. The at least one non-transitory machine readable medium of claim 1, wherein the synaptic weight update process operates to determine the second value of the synaptic weight based on weight normalization and a movement in a direction of first value of the reference weight, based on a drift force and a relaxation force.

7. The at least one non-transitory machine readable medium of claim 1, wherein the spikes in the received spike train are provided from a first plurality of neurons in the spiking neural network, and wherein the spikes in the generated spike train are provided to a second plurality of neurons in the spiking neural network.

8. The at least one non-transitory machine readable medium of claim 1, wherein the spiking neural network is provided by neuromorphic computing hardware having a plurality of cores, wherein respective cores of the plurality of cores are configurable to implement respective neurons used in the spiking neural network, and wherein spikes are used among the respective cores to communicate information on processing actions of the spiking neural network.

9. A computing device configured for implementing learning in a neuron of a spiking neural network, the computing device comprising circuitry to:
process an input at a neuron of the spiking neural network, wherein the processing includes the neuron applying a first value of a synaptic weight in response to at least one spike of a received spike train, and wherein the neuron causes propagation of at least one spike in a generated spike train from a synaptic connection in response to use of the synaptic weight on the received spike train;
generate a second value of the synaptic weight with a synaptic weight update process, wherein the synaptic weight update process evaluates values received from: the first value of the synaptic weight, a first value of a reference weight, at least one synaptic weight configuration parameter, at least one trace of the spikes in the received spike train, and at least one trace of the spikes in the generated spike train;
generate a second value of the reference weight with a reference weight update process, wherein the reference weight update process evaluates inputs received from: the first value of the synaptic weight, the first value of the reference weight, a time constant, and at least one reference weight configuration parameter; and
evaluate a difference between the first value of the synaptic weight and the first value of the reference weight;
wherein, in response to the difference exceeding a significance threshold, the second value of the reference weight is generated to change in a direction towards the first value of the synaptic weight; and
wherein, in response to the difference not exceeding the significance threshold, the second value of the synaptic weight is generated to change in a direction towards the first value of the reference weight.

10. The computing device of claim 9, the circuitry further to:
perform reinforcement learning in the reference weight update process, in response to a reinforcement signal, wherein the reinforcement learning in the reference weight update process includes reduction of a value of the time constant and establishment of the second value of the reference weight with use of the reduced value of the time constant, wherein the second value of the reference weight is updated to converge to the second value of the synaptic weight.

11. The computing device of claim 10, the circuitry further to:
perform unsupervised learning in the synaptic weight update process, in response to absence of the reinforcement signal, wherein the unsupervised learning in the synaptic weight update process includes use of the value of the time constant and establishment of the second value of the synaptic weight by competitive unsupervised learning, wherein the second value of the synaptic weight converges to the first value of the reference weight.

12. The computing device of claim 9, the circuitry further to:
obtain respective values of: the at least one synaptic weight configuration parameter, the at least one reference weight configuration parameter, and the time constant; and
wherein the time constant is initialized to an intermediate value.

13. The computing device of claim 9, the circuitry further to:
determine the second value of the reference weight, with the reference weight update process, from changes to the reference weight over time, based on the time constant and the at least one reference weight configuration parameter.

14. The computing device of claim 9, the circuitry further to:
determine the second value of the synaptic weight, with the synaptic weight update process, from weight normalization and a movement in a direction of first value of the reference weight, based on a drift force and a relaxation force.

15. The computing device of claim 9, wherein the spikes in the received spike train are provided from a first plurality of neurons in the spiking neural network, and wherein the spikes in the generated spike train are provided to a second plurality of neurons in the spiking neural network.

16. The computing device of claim 9, wherein the spiking neural network is provided by neuromorphic computing hardware having a plurality of cores, wherein respective cores of the plurality of cores are configurable to implement respective neurons used in the spiking neural network, and wherein spikes are used among the respective cores to communicate information on processing actions of the spiking neural network.

17. A method of learning implemented in a spiking neural network, comprising:
receiving a first spike at a neuron of the spiking neural network;
applying a first weight to the first spike and forwarding the first spike to a nucleus of the neuron;
updating the first weight for processing of a second spike received at the neuron of the spiking neural network, wherein the first weight is updated based on a result of the forwarding and a second weight, and wherein the first weight is updated based on at least one trace of the spikes in a received spike train, and at least one trace of the spikes in a generated spike train;
updating the second weight based on the first weight, wherein the second weight is a reference weight; and
evaluating a difference between the first value of the synaptic weight and the first value of the reference weight;
wherein, in response to the difference exceeding a significance threshold, the second value of the reference weight is generated to change in a direction towards the first value of the synaptic weight; and
wherein, in response to the difference not exceeding the significance threshold, the second value of the synaptic weight is generated to change in a direction towards the first value of the reference weight.

18. The method of claim 17, further comprising:
receiving a reinforcement signal for reinforcement of the first spike;
wherein, in response to the reinforcement signal, the second weight is updated to converge to the updated first weight.

19. The method of claim 17, wherein updating the first weight includes updating the first weight to converge to the second weight.

20. The method of claim 17, wherein updating the first weight further includes updating the first weight based on a configuration parameter.

21. The method of claim 17, wherein updating the second weight further includes updating the second weight based on a time constant and a configuration parameter.

22. The method of claim 17, wherein the nucleus of the neuron is configured to activate in response to values from a plurality of spikes including the first spike and the second spike exceeding a threshold.

23. The method of claim 17, wherein the spiking neural network is provided by neuromorphic computing hardware having a plurality of cores, wherein respective cores of the plurality of cores are configurable to implement respective neurons used in the spiking neural network, and wherein spikes are used among the respective cores to communicate information on processing actions of the spiking neural network.

* * * * *